United States Patent
Makino et al.

(10) Patent No.: US 10,175,836 B2
(45) Date of Patent: Jan. 8, 2019

(54) CONDUCTIVE SHEET, TOUCH PANEL DEVICE, AND DISPLAY DEVICE

(71) Applicant: Sharp Kabushiki Kaisha, Osaka (JP)

(72) Inventors: Hiroki Makino, Osaka (JP); Mikihiro Noma, Osaka (JP); Tomotoshi Tsujioka, Osaka (JP); Daiji Kitagawa, Osaka (JP); Hiroyuki Ogawa, Osaka (JP); Yasuhiro Sugita, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 72 days.

(21) Appl. No.: 15/312,129

(22) PCT Filed: May 15, 2015

(86) PCT No.: PCT/JP2015/064012
§ 371 (c)(1),
(2) Date: Nov. 17, 2016

(87) PCT Pub. No.: WO2015/178304
PCT Pub. Date: Nov. 26, 2015

(65) Prior Publication Data
US 2017/0090625 A1    Mar. 30, 2017

(30) Foreign Application Priority Data

May 21, 2014    (JP) .................................. 2014-105390

(51) Int. Cl.
*G06F 3/044*    (2006.01)
*G06F 3/041*    (2006.01)

(52) U.S. Cl.
CPC ............ *G06F 3/044* (2013.01); *G06F 3/0412* (2013.01); *G06F 3/0416* (2013.01); *G06F 2203/04111* (2013.01)

(58) Field of Classification Search
None
See application file for complete search history.

(56) References Cited

U.S. PATENT DOCUMENTS

2009/0085885 A1* 4/2009 Wu .......................... G06F 3/041
 345/173
2009/0267916 A1* 10/2009 Hotelling ................ G06F 3/044
 345/174

(Continued)

FOREIGN PATENT DOCUMENTS

JP    2012-150782 A    8/2012

*Primary Examiner* — Amare Mengistu
*Assistant Examiner* — Sarvesh J Nadkarni
(74) *Attorney, Agent, or Firm* — ScienBiziP, P.C.

(57) ABSTRACT

A touch panel is realized that is able to decrease the amount of dead space at the periphery of the touch panel and that has highly accurate touch panel sensitivity. In a touch panel, Y direction conductive patterns are arranged so as to be separated from wiring patterns in Y direction conductive pattern regions between electrode units of X direction conductive patterns. As a result, in this conductive sheet, it is possible to appropriately prevent the occurrence of parasitic capacitance resulting from the Y direction conductive patterns and the wiring patterns. Therefore, in a touch panel device or the like that uses such a touch panel, it is possible to effectively prevent the generation of noise that overlaps sense signals as a result of the above-mentioned parasitic capacitance, thereby making it possible to realize highly accurate touch panel sensitivity.

5 Claims, 15 Drawing Sheets

(56) References Cited

U.S. PATENT DOCUMENTS

| | | | | |
|---|---|---|---|---|
| 2011/0007020 A1* | 1/2011 | Hong | ................... | G06F 3/0412 345/174 |
| 2012/0182233 A1* | 7/2012 | Kim | ....................... | G06F 3/044 345/173 |
| 2015/0212632 A1* | 7/2015 | Wang | ..................... | G06F 3/044 345/173 |
| 2015/0277635 A1* | 10/2015 | Kim | ....................... | G06F 3/047 345/173 |

\* cited by examiner

CONDUCTIVE SHEET, TOUCH PANEL DEVICE, AND DISPLAY DEVICE

TECHNICAL FIELD

The present invention relates to a conductive sheet (a touch panel, for example) used in touch panel devices, touch panel display devices, and the like.

BACKGROUND ART

A touch panel device is a device in which information can be input into an instrument as a result of a finger or pen touching the touch panel surface. In recent years, capacitive touch panel devices, which have good detection sensitivity and excellent operability, have been used in various types of devices. In particular, capacitive touch panel devices, which can accurately detect the coordinates at which a finger or pen contacts the touch panel surface, are widely used.

Capacitive touch panel devices include a plurality of drive lines and a plurality of sense lines. A plurality of X axis direction sense electrodes are provided on the respective drive lines, and a plurality of Y axis direction sense electrodes are provided on the respective sense lines. In a capacitive touch panel device, driving pulse signals are output to the drive lines in a sequential manner, and changes in an electric field between the X axis direction sense electrodes and the Y axis direction sense electrodes are detected. In other words, by detecting signals in the sense lines that correspond to changes in the electric field between the X axis direction sense electrodes and the Y axis direction sense electrodes, the coordinates at which the finger or pen contacted the touch panel surface are detected in the capacitive touch panel device.

In a touch panel display device, colored regions that have been colored black or the like are provided to the periphery of the region in which the touch panel is disposed in order to ensure that wiring patterns, which electrically connect to the sense electrodes of the touch panel in order to output driving pulses to the sense electrodes of the touch panel, are less visible. By disposing the wiring patterns for electrically connecting to the sense electrodes of the touch panel below the regions that have been painted black or the like, it is possible to realize a touch panel display device in which the wiring patterns are less visible and that has an excellent appearance.

In such a touch panel display device, it is necessary to provide the regions painted in black or the like to the periphery of the touch panel in order to decrease the visibility of the wiring patterns that connect to the sense electrodes of the touch panel. In other words, in a touch panel display device such as that described above, there is dead space at the periphery of the touch panel, and it is difficult to realize a touch panel display device with a narrow frame.

In order to decrease the dead space at the periphery of the touch panel, in the touch panel device disclosed in Patent Document 1 (Japanese Patent Application Laid-Open Publication No. 2012-150782), for example, the wiring patterns that electrically connect to the sense electrodes of the touch panel are provided inside the touch panel. FIG. 15 shows a schematic configuration diagram of a touch panel device 900 realized by using the technology disclosed in Patent Document 1. As shown in FIG. 15, an X axis and a Y axis are set.

As shown in FIG. 15, the touch panel device 900 includes: a substrate 901; a touch panel TP9; and a terminal group 902. X axis direction sense electrodes X91 to X94 and Y axis direction sense electrodes Y91 to Y94 are provided on the touch panel TP9.

As shown in FIG. 15, the terminal group 902 includes: X axis direction sense electrode terminals Tx91 to Tx94 that are respectively connected to the X axis direction sense electrodes X91 to X94; and Y axis direction sense electrode terminals Ty91 to Ty94 that are respectively connected to the Y axis direction sense electrodes Y91 to Y94.

In addition, as shown in FIG. 15, wiring patterns (a wiring pattern extending from a connecting point Cx91 to a connecting point Ce91, a wiring pattern extending from a connecting point Cx92 to a connecting point Ce92, a wiring pattern extending from a connecting point Cx93 to a connecting point Ce93, and a wiring pattern extending from a connecting point Cx94 to a connecting point Ce94) for connecting the X axis direction sense electrodes X91 to X94 and the X axis direction sense electrode terminals Tx91 to Tx94 are provided in the touch panel device 900.

The wiring pattern extending from the connecting point Cx91 to the connecting point Ce91 is electrically connected to the X axis direction sense electrode X91 at the connecting point Cx91, and is connected to the X axis direction sense electrode terminal Tx91 at the connecting point Ce91 via wiring provided on the substrate 901.

The wiring pattern extending from the connecting point Cx92 to the connecting point Ce92 is electrically connected to the X axis direction sense electrode X92 at the connecting point Cx92, and is connected to the X axis direction sense electrode terminal Tx92 at the connecting point Ce92 via wiring provided on the substrate 901.

The wiring pattern extending from the connecting point Cx93 to the connecting point Ce93 is electrically connected to the X axis direction sense electrode X93 at the connecting point Cx93, and is connected to the X axis direction sense electrode terminal Tx93 at the connecting point Ce93 via wiring provided on the substrate 901.

The wiring pattern extending from the connecting point Cx94 to the connecting point Ce94 is electrically connected to the X axis direction sense electrode X94 at the connecting point Cx94, and is connected to the X axis direction sense electrode terminal Tx94 at the connecting point Ce94 via wiring provided on the substrate 901.

As can be seen from FIG. 15, the wiring pattern extending from the connecting point Cx91 to the connecting point Ce91 is provided such that the wiring pattern is substantially parallel to the border on the wiring pattern side of the Y axis direction sense electrode Y91 in a region near the Y axis direction sense electrode Y91. In other words, the wiring pattern extending from the connecting point Cx91 to the connecting point Ce91 and the Y axis direction sense electrode Y91 are provided so as to extend substantially parallel to and near each other (sandwiching a region formed of an insulator (or a dielectric)); thus, there is an increase in the parasitic capacitance generated between the Y axis direction sense electrode Y91 and the wiring pattern extending from the connecting point Cx91 to the connecting point Ce91.

In addition, parasitic capacitance is generated for the same reason for each of the following: (1) the Y axis direction sense electrode Y92 and the wiring pattern extending from the connecting point Cx92 to the connecting point Ce92; (2) the Y axis direction sense electrode Y93 and the wiring pattern extending from the connecting point Cx93 to the connecting point Ce93; and (3) the Y axis direction sense electrode Y94 and the wiring pattern extending from the connecting point Cx94 to the connecting point Ce94.

In this manner, in the touch panel device 900, it is possible to decrease the amount of dead space at the periphery of the touch panel since the wiring patterns for connecting to the X axis direction sense electrodes are provided inside the touch panel TP9.

SUMMARY OF THE INVENTION

Problems to be Solved by the Invention

However, as described above, in the touch panel device 900, there is an increase in the parasitic capacitance since the wiring patterns for connecting to the X axis direction sense electrodes are disposed so as to extend substantially parallel to and near the Y axis direction sense electrodes. In particular, there is a high likelihood that a large amount of noise due to the parasitic capacitance will superimpose onto sense signals from the X axis direction sense electrodes connected to the wiring patterns in which the substantially parallel state is long and onto sense signals from the Y axis direction sense electrodes near these wiring patterns. As a result, there may be a decrease in the functionality of the touch panel in which there is a decrease in the response speed for signals that detect touch locations. The present invention therefore takes into account the above-mentioned problems, and an aim thereof is to realize a conductive sheet, a touch panel device, and a display device that can decrease the amount of dead space at the periphery of the touch panel and that have a high degree of touch panel sensitivity.

Means for Solving the Problems

In order to solve the above-mentioned problems, a first configuration is a conductive sheet that includes: N (where N is a natural number greater than or equal to two) X direction conductive patterns; M (where M is a natural number greater than or equal to two) Y direction conductive patterns; a terminal unit; and wiring patterns.

The N (where N is a natural number greater than or equal to two) X direction conductive patterns respectively include: a plurality of X direction electrode units disposed in a first direction; and X direction connecting sections that electrically connect to each other the X direction electrode units that are adjacent.

The M (where M is a natural number greater than or equal to two) Y direction conductive patterns respectively include: a plurality of Y direction electrode units disposed in a second direction that intersects the first direction; and Y direction connecting sections that electrically connect to each other the Y direction electrode units that are adjacent.

The terminal unit includes terminals for electrically connecting to the X direction conductive patterns and the Y direction conductive patterns, respectively.

The wiring patterns electrically connect the X direction conductive patterns and the terminals of the terminal unit that correspond to the X direction conductive patterns.

Furthermore, in a plan view, when regions between the X direction electrode units and the X direction electrode units that are adjacent to the X direction electrode units on one side in the first direction are Y direction conductive pattern regions, and regions between the X direction electrode units and the X direction electrode units that are adjacent to the X direction electrode units on another side in the first direction are wiring pattern regions, the Y direction conductive patterns are disposed in the Y direction conductive pattern regions, and the wiring patterns are disposed in the wiring pattern regions. The Y direction conductive pattern regions and the wiring pattern regions are alternately provided in the first direction in regions sandwiched between two of the X direction electrode units that are adjacent.

Effects of the Invention

According to the present invention, it is possible to realize a conductive sheet, a touch panel device, and a display device that can decrease the amount of dead space at the periphery of the touch panel and that have a high degree of touch panel sensitivity.

DETAILED DESCRIPTION OF EMBODIMENTS

Embodiment 1

Embodiment 1 will be described below with reference to the drawings.

Figure 1:
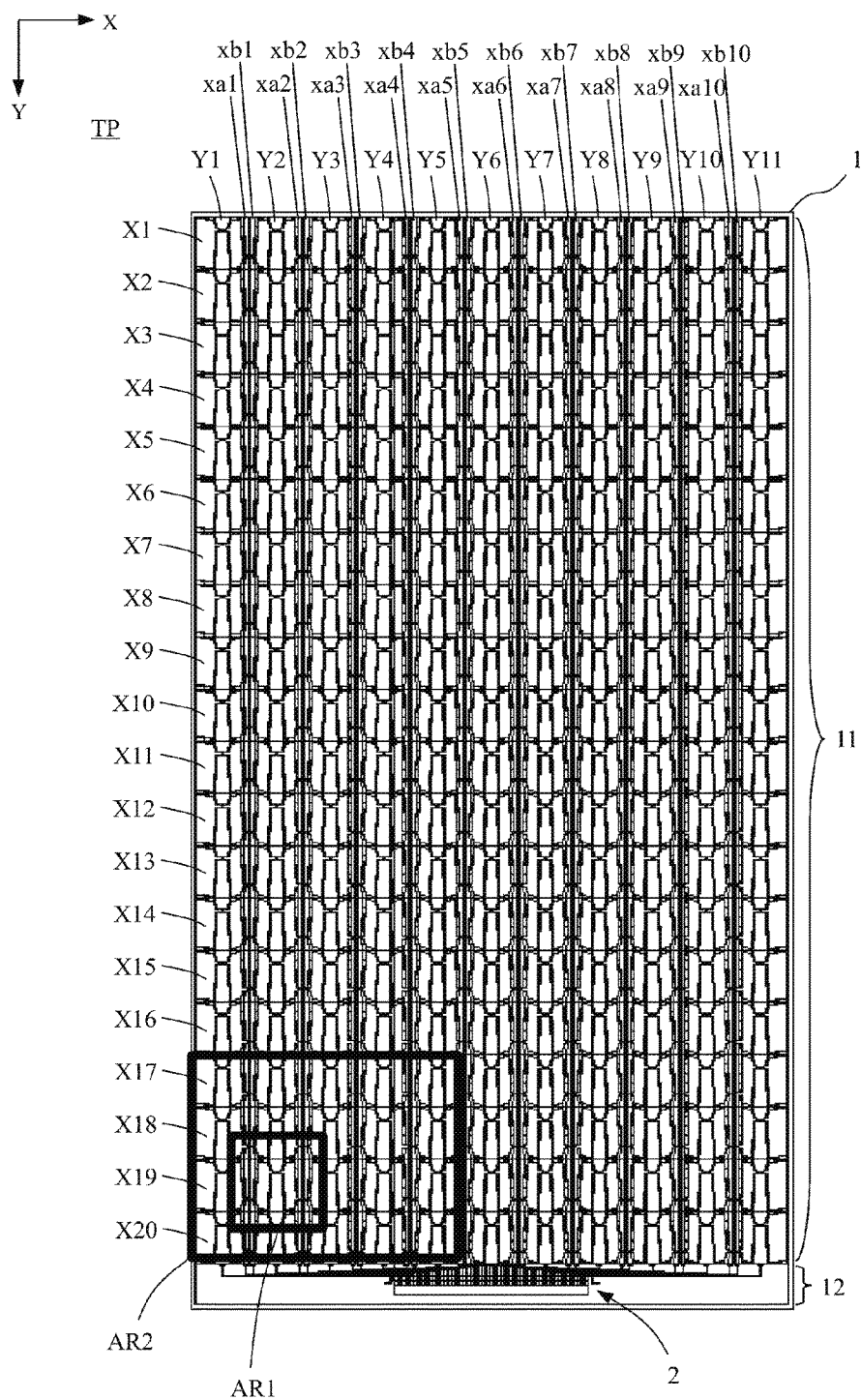
FIG. 1 is a schematic configuration diagram of a touch panel TP that is one example of a conductive sheet according to Embodiment 1.

FIG. 1 is (one example of) a schematic configuration diagram of a touch panel TP that is one example of a conductive sheet according to Embodiment 1. Specifically, FIG. 1 is a plan view of the touch panel TP.

Figure 2:
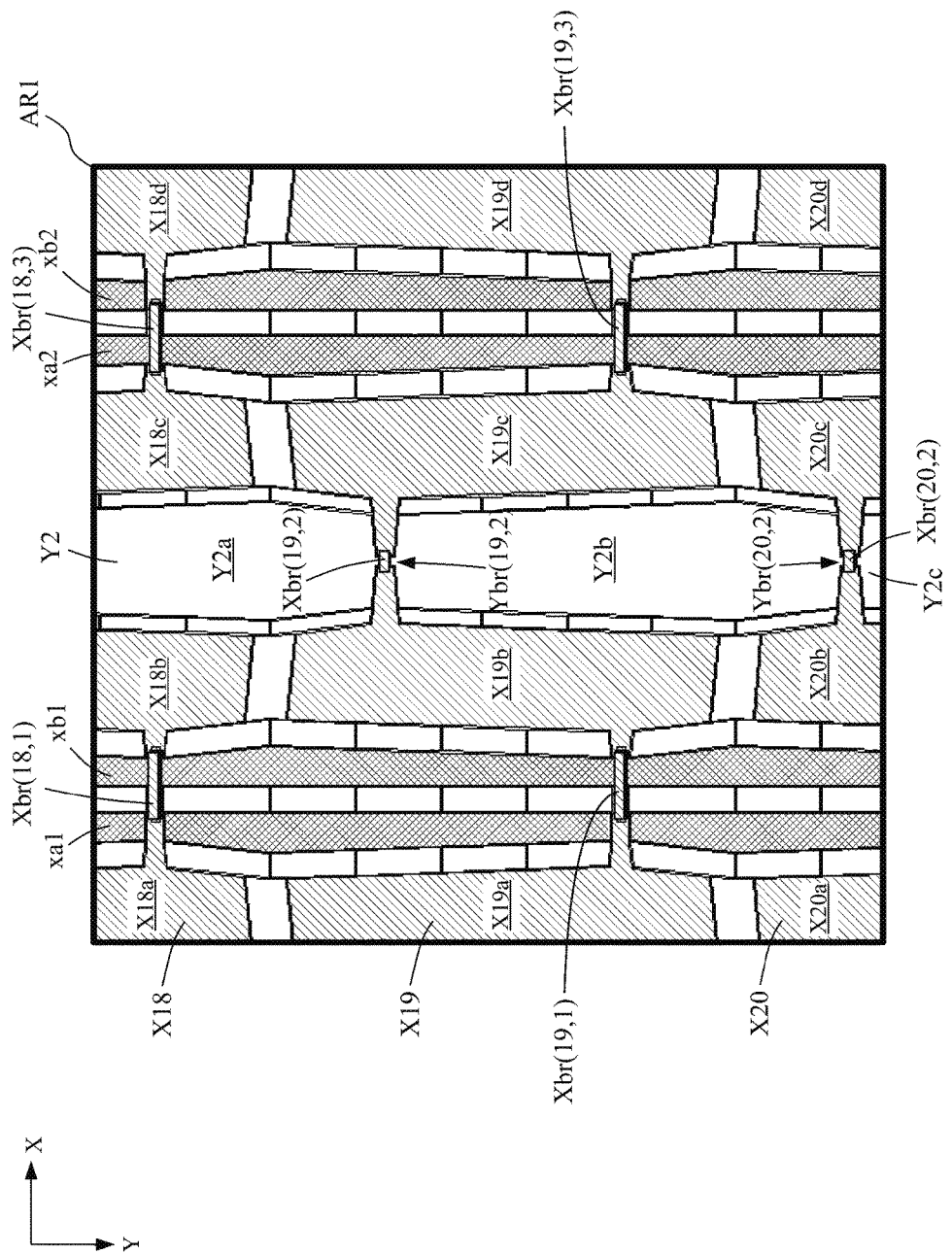
FIG. 2 enlarges and shows a region AR1 that is a portion of a plan view of the touch panel TP of Embodiment 1.

FIG. 2 enlarges and shows a region AR1 that is a portion of the plan view of the touch panel TP of FIG. 1.

As shown in FIGS. 1 and 2, an X axis and a Y axis are set in FIGS. 1 and 2.

Figure 3:
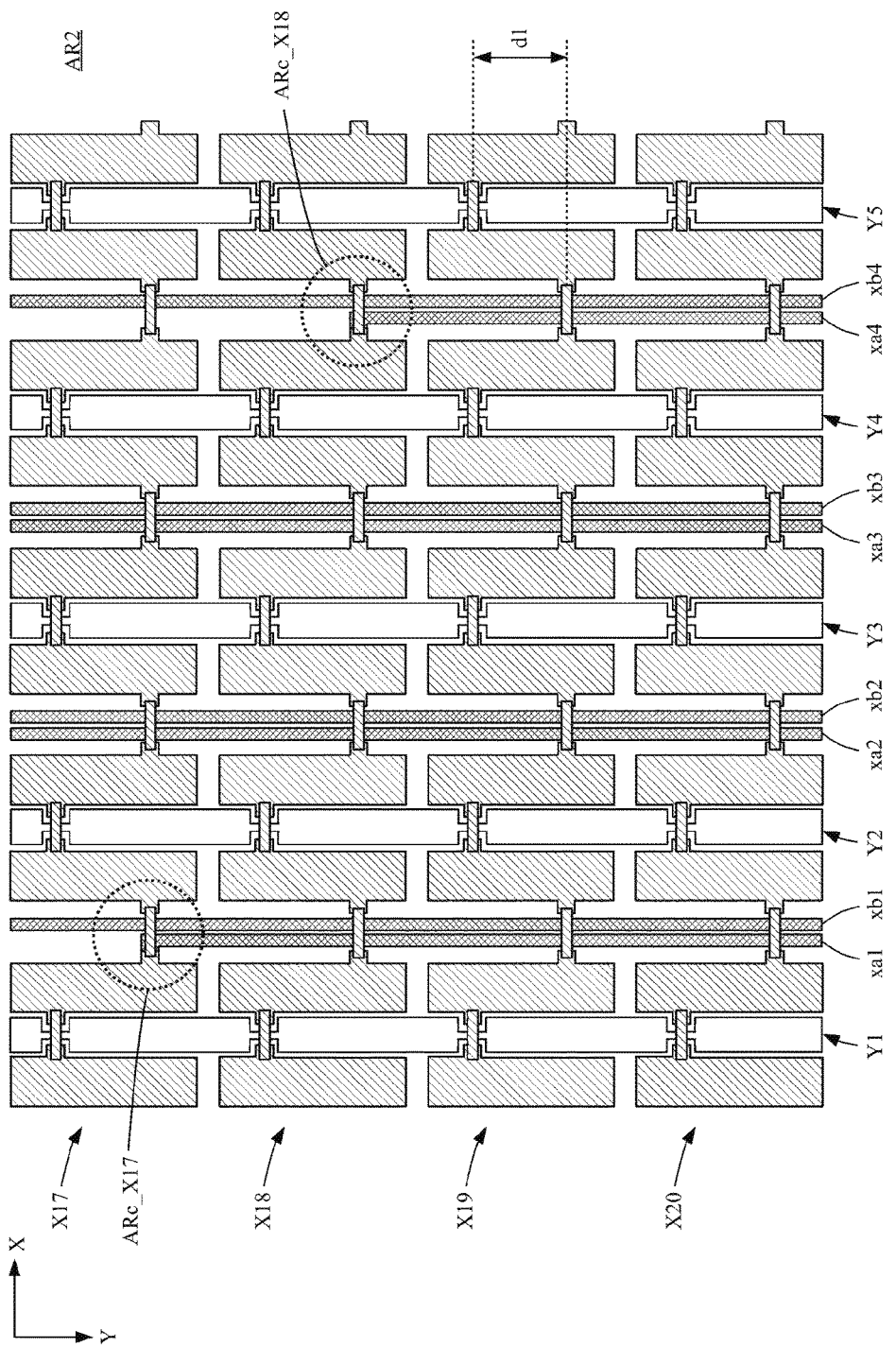
FIG. 3 enlarges and schematically shows a region AR2 that is a portion of the plan view of the touch panel TP of Embodiment 1.

FIG. 3 enlarges and schematically shows a region AR2 that is a portion of the plan view of the touch panel TP of FIG. 1. For ease of description, in FIG. 3, the electrode units, connecting sections, and wiring patterns are drawn as patterns having a polygonal shape.

As shown in FIG. 1, the touch panel TP includes: a substrate 1; X direction conductive patterns X1 to X20 formed on the substrate 1; Y direction conductive patterns Y1 to Y11 formed on the substrate 1; wiring patterns xa1 to xa10, xb1 to xb10; and a terminal unit 2.

(1.1: The Substrate 1)

The substrate 1 has insulating properties and is formed via a material that has high light transmittance (a colorless transparent resin, a glass, a plastic, or PET (polyethylene terephthalate), or the like, for example). It is preferable that the thickness of the substrate 1 be at a thickness such that it is possible to adequately transmit light from the display screen when the substrate 1 is disposed so as to cover the display screen, for example.

As shown in FIG. 1, the substrate 1 has a display region 11 and a wiring region 12.

As shown in FIG. 1, the display region 11 is a region in which the following are formed: the X direction conductive patterns X1 to X20; the Y direction conductive patterns Y1 to Y11; and the wiring patterns xa1 to xa10, xb1 to xb10.

As shown in FIG. 1, the wiring region 12 is a region in which the following are formed: the terminal unit 2; wiring that connects terminals of the terminal unit 2 and the Y direction conductive patterns Y1 to Y11; and wiring that connects terminals of the terminal unit 2 and the wiring patterns xa1 to xa10, xb1 to xb10. The wiring region 12 is colored black or the like, for example, in order to prevent the wiring patterns in the wiring region 12 from being noticeable.

(1.2: X Direction Conductive Patterns)

The X direction conductive patterns X1 to X20 are formed on the substrate 1. The X direction conductive patterns X1 to X20 are formed of a conductor, for example. The X direction conductive patterns X1 to X20 are transparent electrodes (electrodes with a high degree of light transmittance) formed using indium tin oxide (ITO), for example.

The X direction conductive patterns X1 to X20 respectively include: a plurality of electrode units (X18a to X18d, X19a to X19d, and X20a to X20d shown in FIG. 2, for example); and connecting sections (Xbr(18,1), Xbr(18,3), Xbr(19,1), Xbr(19,2), Xbr(19,3), and Xbr(20,2) shown in FIG. 2, for example) that connected adjacent electrode units to each other.

The respective X direction conductive patterns X1 to X20 include a plurality of electrode units and a plurality of connecting sections. As shown in FIGS. 1 and 2, in the respective X direction conductive patterns X1 to X20, the plurality of electrode units are arranged in a substantially straight line in the X axis direction in a plan view, and, as shown in FIGS. 1 and 2, adjacent electrode units are connected to each other via a connecting section.

The electrode units are disposed so as to ensure that there is a Y direction conductive pattern region, which is a region for disposing a Y direction conductive pattern between adjacent electrode units, on one side in the X axis direction.

In addition, the electrode units are arranged so as to ensure that there is a wiring pattern region, which is a region for disposing a wiring pattern between adjacent electrode units, on the other side in the X axis direction.

For example, as shown in FIG. 2, the electrode unit X19b is disposed such that a Y direction conductive pattern region (the region in FIG. 2 in which the Y direction conductive pattern Y2 is disposed) is ensured to exist on the positive direction side along the X axis, and a wiring pattern region (a region in FIG. 2 in which the wiring patterns xa1, xb1 are disposed) is ensured to exist on the negative direction side along the X axis.

In a similar manner, X direction conductive patterns and Y direction conductive patterns are also arranged in the region AR2 shown in FIG. 3. In other words, as shown in FIG. 3, the various electrode units of the X direction conductive patterns X17 to X20 are arranged so as alternately sandwich the Y direction conductive pattern regions and the wiring pattern regions. Put another way, as shown in FIG. 3, the furthest left electrode unit and the second electrode unit from the left in the X direction conductive patterns X17 to X20 are arranged so as to sandwich the Y direction conductive pattern Y1, and the second electrode unit from the left and the third electrode unit from the left in the X direction conductive patterns X17 to X20 are arranged so as to sandwich the wiring patterns xa1, xb1. As shown in FIG. 3, the other electrode units are arranged using a similar pattern.

As shown in FIG. 3, the connecting sections of the X direction conductive pattern are arranged such that the locations in the Y axis direction of the connecting sections for the Y direction conductive pattern regions and the locations in the Y axis direction of the connecting sections for the wiring pattern regions differ from one other (in FIG. 3, the connecting sections are arranged such that the distance between the sections is equal to a distance d1). As a result, the connecting sections are arranged in a fixed pattern, and it is possible to suitably prevent the patterns from having an undesirable appearance (such as the occurrence of moiré).

By forming the electrode units and the connecting sections in this manner, one row of X axis direction conductive units (the X direction conductive pattern X19 shown in FIG. 2 or the X direction conductive patterns X17 to X20 shown in FIG. 3, for example) is formed. As shown in FIG. 1, the X axis direction conductive units formed in this manner are arranged in plurality in the Y axis direction.

The X direction conductive patterns X1 to X20 are respectively electrically connected to the corresponding wiring patterns xa1 to xa10, xb1 to xb10. The wiring patterns xa1 to xa10, xb1 to xb10 are respectively electrically connected to the corresponding terminals of the terminal unit 2 via the wiring of the wiring region 12. This will be explained using FIGS. 4 and 5.

Figure 4:
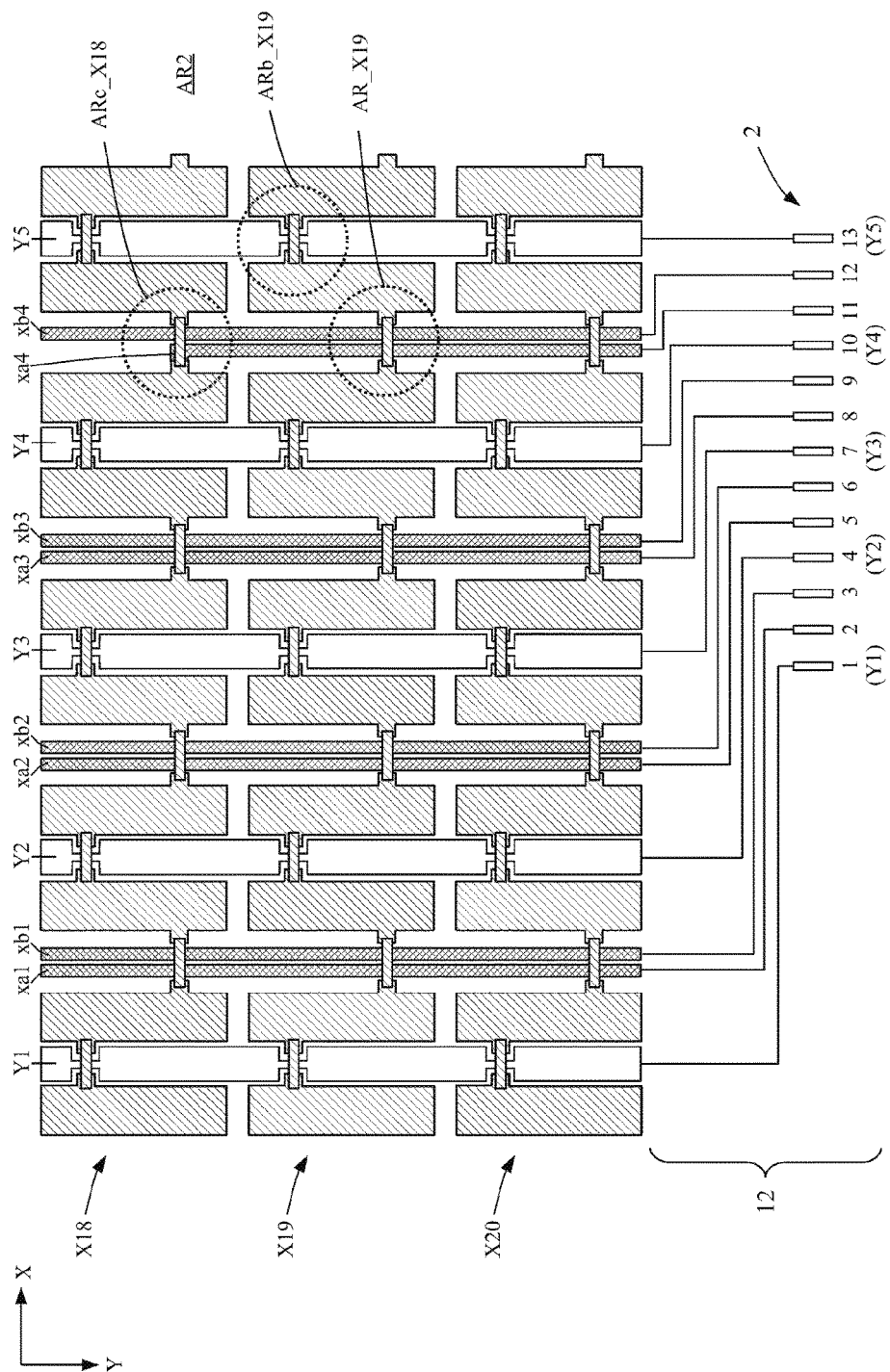
FIG. 4 schematically shows a portion of a wiring region 12 and a portion of the region AR2 of the touch panel TP of Embodiment 1.

FIG. 4 schematically shows a portion of the wiring region 12 and a portion of the region AR2 of the touch panel TP in FIG. 1. FIG. 4 shows a portion of the terminals of the terminal unit 2. As shown in FIG. 4, for ease of description, the terminals have been given the terminal numbers 1 to 13.

Figure 5:
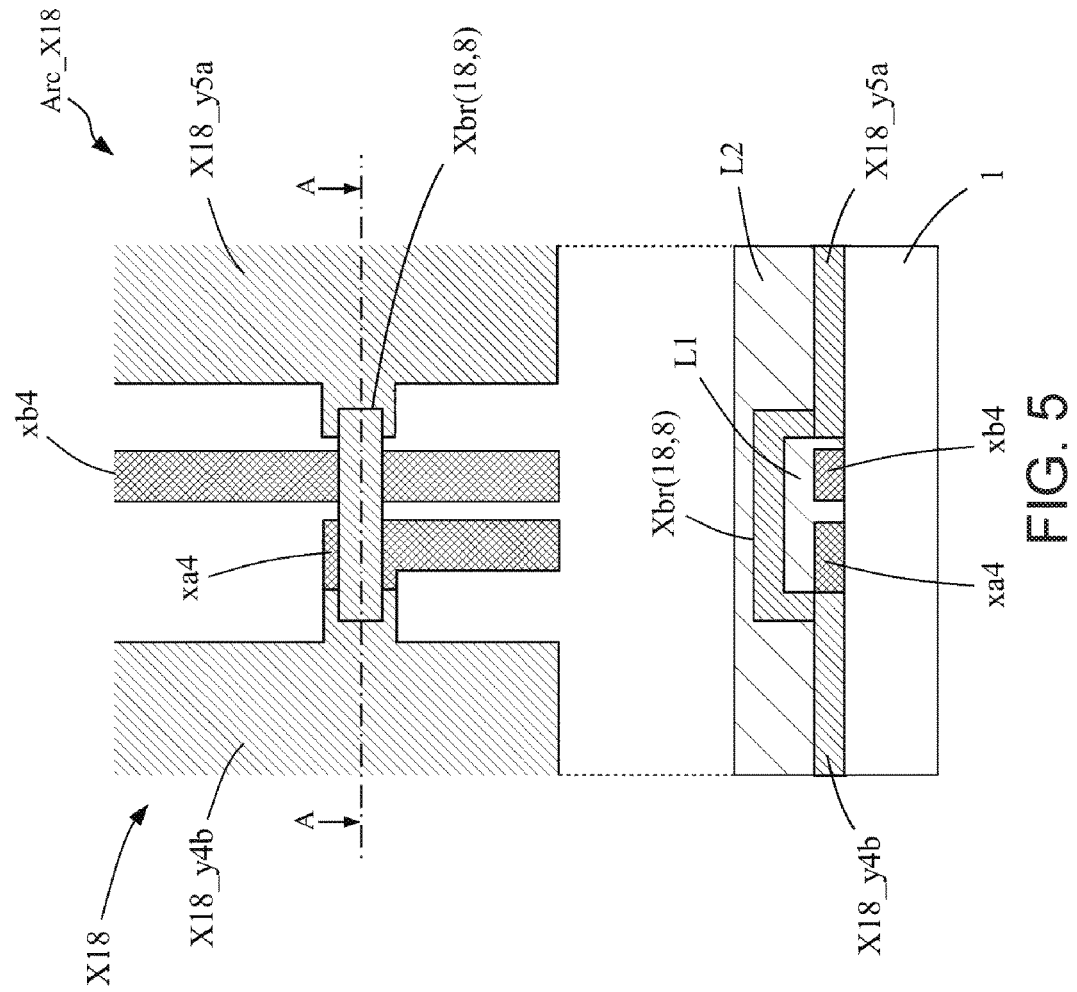
FIG. 5 enlarges and shows a connecting region ARc_X18 shown in FIGS. 3 and 4.

FIG. 5 enlarges and shows the connecting region ARc_X18 shown in FIGS. 3 and 4. Specifically, FIG. 5 is an enlarged view (the upper diagram in FIG. 5) of the connecting region ARc_X18 of the X direction conductive pattern X18 and the wiring pattern xa4, and an A-A cross-sectional view (the lower diagram in FIG. 5) along a line A-A in FIG. 5.

As shown in FIG. 5, the electrode unit X18_y4b of the X direction conductive pattern X18 and the electrode unit X18_y5a of the X direction conductive pattern X18 are formed on the substrate 1.

In addition, as shown in FIG. 5, the wiring pattern xa4 and the wiring pattern xb4 are formed on the substrate 1.

As shown in FIG. 5, the wiring pattern xa4 is arranged so as to contact the electrode unit X18_y4b, whereby the wiring pattern xa4 is electrically connected to the electrode unit X18_y4b.

In addition, the connecting section Xbr(18,8) is arranged as shown in FIG. 5, with one end thereof being connected to the electrode unit X18_y4b and the other end thereof being connected to the electrode unit X18_y5a. As a result, the electrode unit X18_y4b and the electrode unit X18_y5a are electrically connected via the connecting section Xbr(18,8).

As shown in FIG. 5, overcoat layers L1, L2 made of an insulating substance are formed, and the wiring pattern xb4 is insulated from (not electrically connected to) the wiring pattern xa4, the electrode units X18_y4b, X18_y5a, and the connecting section Xbr(18,8).

By arranging the electrode units X18_y4b, X18_y5a and the wiring pattern xa4 in the manner described above, the electrode units X18_y4b, X18_y5a and the wiring pattern xa4 are electrically connected. In other words, the wiring pattern xa4 is electrically connected to the X direction conductive pattern X18.

The connection of the other X direction conductive patterns and the corresponding wiring patterns is similar to that described above. For example, in the connecting region ARc_X17 of FIG. 3, the X direction conductive patterns and the corresponding wiring patterns are electrically connected using the same configuration as described above.

Next, the connective relationship between the X direction conductive patterns and the terminal unit 2 will be explained using FIG. 4.

As shown in FIG. 4, the terminal of terminal number 2 is connected to the wiring pattern xa1, and, as shown in FIG. 3, the wiring pattern xa1 is connected to the X direction conductive pattern X17. In other words, the terminal of terminal number 2 is connected to the X direction conductive pattern X17 via the wiring pattern xa1. Therefore, by inputting signals for driving the X direction conductive pattern X17 to the terminal of terminal number 2, it is possible to generate a prescribed electric field in the X direction conductive pattern X17.

The terminal of terminal number 3 is connected to the wiring pattern xb1, and the wiring pattern xb1 is connected to the X direction conductive pattern X7, for example. In other words, the terminal of terminal number 3 is connected to the X direction conductive pattern X7 via the wiring pattern xb1. Therefore, by inputting signals for driving the X direction conductive pattern X7 to the terminal of terminal number 3, it is possible to generate a prescribed electric field in the X direction conductive pattern X7.

The terminal of terminal number 5 is connected to the wiring pattern xa2, and the wiring pattern xa2 is connected to the X direction conductive pattern X14, for example. In other words, the terminal of terminal number 5 is connected to the X direction conductive pattern X14 via the wiring pattern xa2. Therefore, by inputting signals for driving the X direction conductive pattern X14 to the terminal of terminal number 5, it is possible to generate a prescribed electric field in the X direction conductive pattern X14.

The terminal of terminal number 6 is connected to the wiring pattern xb2, and the wiring pattern xb2 is connected to the X direction conductive pattern X4, for example. In other words, the terminal of terminal number 6 is connected to the X direction conductive pattern X4 via the wiring pattern xb2. Therefore, by inputting signals for driving the X direction conductive pattern X4 to the terminal of terminal number 6, it is possible to generate a prescribed electric field in the X direction conductive pattern X4.

The terminal of terminal number 8 is connected to the wiring pattern xa3, and the wiring pattern xa3 is connected to the X direction conductive pattern X11, for example. In other words, the terminal of terminal number 8 is connected to the X direction conductive pattern X11 via the wiring pattern xa3. Therefore, by inputting signals for driving the X direction conductive pattern X11 to the terminal of terminal number 8, it is possible to generate a prescribed electric field in the X direction conductive pattern X11.

The terminal of terminal number 9 is connected to the wiring pattern xb3, and the wiring pattern xb3 is connected to the X direction conductive pattern X1, for example. In other words, the terminal of terminal number 9 is connected to the X direction conductive pattern X1 via the wiring pattern xb3. Therefore, by inputting signals for driving the X direction conductive pattern X1 to the terminal of terminal number 9, it is possible to generate a prescribed electric field in the X direction conductive pattern X1.

The terminal of terminal number 11 is connected to the wiring pattern xa4, and the wiring pattern xa4 is connected to the X direction conductive pattern X18, for example. In other words, the terminal of terminal number 11 is connected to the X direction conductive pattern X18 via the wiring pattern xa4. Therefore, by inputting signals for driving the X direction conductive pattern X18 to the terminal of terminal number 11, it is possible to generate a prescribed electric field in the X direction conductive pattern X18.

The terminal of terminal number 12 is connected to the wiring pattern xb4, and the wiring pattern xb4 is connected to the X direction conductive pattern X8, for example. In other words, the terminal of terminal number 12 is connected to the X direction conductive pattern X8 via the wiring pattern xb4. Therefore, by inputting signals for driving the X direction conductive pattern X8 to the terminal of terminal number 12, it is possible to generate a prescribed electric field in the X direction conductive pattern X8.

(1.3: Y Direction Conductive Patterns)

The Y direction conductive patterns Y1 to Y11 are formed on the substrate 1. The Y direction conductive patterns Y1 to Y11 are formed of a conductor, for example. The Y direction conductive patterns Y1 to Y11 are transparent electrodes (electrodes with a high degree of light transmittance) formed using indium tin oxide (ITO), for example.

The Y direction conductive patterns Y1 to Y11 respectively include: a plurality of electrode units (Y2a, Y2b, and Y2c shown in FIG. 2, for example); and connecting sections (Ybr(19,2) and Ybr(20,2) shown in FIG. 2, for example) that connect adjacent electrode units to each other.

The respective Y direction conductive patterns Y1 to Y11 include a plurality of electrode units and a plurality of connecting sections. As shown in FIGS. 1 and 2, in the respective Y direction conductive patterns Y1 to Y11, the plurality of electrode units are arranged in a substantially straight line in the Y axis direction in a plan view, and, as shown in FIGS. 1 and 2, adjacent electrode units are connected to each other via a connecting section.

The electrode units of the Y direction conductive patterns are arranged in Y direction conductive pattern regions between electrode units of the X direction conductive patterns. In other words, as shown in FIGS. 2 and 3, the electrode units of the Y direction conductive patterns are arranged so as to be separated from the wiring patterns. As a result, it is possible to appropriately prevent the occurrence of parasitic capacitance resulting from the Y direction conductive patterns and the wiring patterns.

For example, as shown in FIG. 2, the Y direction conductive pattern Y2 is arranged in a region (a Y direction conductive pattern region) sandwiched between the X direction conductive pattern electrode units X18b, X19b, X20b and the X direction conductive pattern electrode units X18c, X19c, X20c. In other words, the distance between the Y direction conductive pattern Y2 and the wiring pattern xa1/the wiring pattern xb1 is sufficiently large, and the distance between the Y direction conductive pattern Y2 and the wiring pattern xa2/the wiring pattern xb2 is also sufficiently large. Therefore, there is almost no parasitic capacitance generated between the Y direction conductive pattern Y2 and the wiring pattern xa1/the wiring pattern xb1, and there is almost no parasitic capacitance generated between the Y direction conductive pattern Y2 and the wiring pattern xa2/the wiring pattern xb2.

By forming the electrode units and the connecting sections of the Y direction conductive patterns in this manner, one row of Y axis direction conductive units (the Y direction conductive pattern Y2 shown in FIG. 2 or the Y direction conductive patterns Y1 to Y5 shown in FIG. 3, for example) is formed. As shown in FIG. 1, the Y axis direction conductive units formed in this manner are arranged in plurality in the X axis direction.

Next, the connective relationship between the Y direction conductive patterns and the terminal unit 2 will be explained using FIG. 4.

As shown in FIG. 4, the terminal of terminal number 1 is connected to the Y direction conductive pattern Y1.

The terminal of terminal number 4 is connected to the Y direction conductive pattern Y2.

The terminal of terminal number 7 is connected to the Y direction conductive pattern Y3.

The terminal of terminal number 10 is connected to the Y direction conductive pattern Y4.

The terminal of terminal number 13 is connected to the Y direction conductive pattern Y5.

The other Y direction conductive patterns are connected to corresponding terminals of the terminal unit 2 in a similar manner.

The Y direction conductive patterns Y1 to Y11 are respectively connected to a reception circuit (not shown) via the corresponding terminals of the terminal unit 2. The reception circuit is able to detect changes in the electric fields on the touch panel TP surface by reading current values (alternatively voltage values) or the like generated in the respective Y direction conductive patterns Y1 to Y11.

As shown in FIGS. 1 to 4, the Y direction conductive patterns Y1 to Y11 are formed in locations that are at a sufficient distance from the wiring patterns xa1 to xa10, xb1 to xb10; thus, it is possible to appropriately prevent parasitic capacitance generated as a result of the Y direction conductive patterns and the wiring patterns. Therefore, via the Y direction conductive patterns Y1 to Y11, sense signals acquired via the reception circuit become high quality signals in which there is no superimposition of noise resulting from parasitic capacitance. Therefore, in a touch panel device that uses the touch panel TP, it is possible to detect changes in the electric field on the touch panel TP surface with a high degree of accuracy. As a result, by using the touch panel TP, it is possible to realize a touch panel device that has a highly accurate touch detection function.

(1.4: Wiring Patterns)

The wiring patterns xa1 to xa10, xb1 to xb10 are formed on the substrate 1. The wiring patterns xa1 to xa10, xb1 to xb10 are formed of a conductor, for example. It is preferable that the wiring patterns xa1 to xa10, xb1 to xb10 be formed using indium tin oxide (ITO), for example, and that the light transmittance thereof be sufficiently high.

As shown in FIGS. 1 and 2, the wiring patterns xa1 to xa10, xb1 to xb10 are arranged in wiring pattern regions that are regions sandwiched between X direction conductive pattern electrode units. The wiring patterns xa1 to xa10, xb1 to xb10 are respectively electrically connected to the corresponding X direction conductive pattern using a configuration similar that shown in FIG. 5.

(1.5: Terminal Unit)

The terminal unit 2 includes a plurality of terminals. As shown in FIG. 1, the various terminals are formed on the substrate 1 and are disposed in the wiring region 12.

The terminals of the terminal unit 2 are respectively connected to one of the following via the wiring provided in the wiring region 12: the Y direction conductive patterns Y1 to Y11; the X direction conductive patterns X1 to X20; and the wiring patterns xa1 to xa10, xb1 to xb10.

A GND terminal (a terminal that connects to the GND) may be provided in the terminals of the terminal unit 2.

The connections of the various terminals of the terminal unit 2 will be described using FIG. 6.

Figure 6:
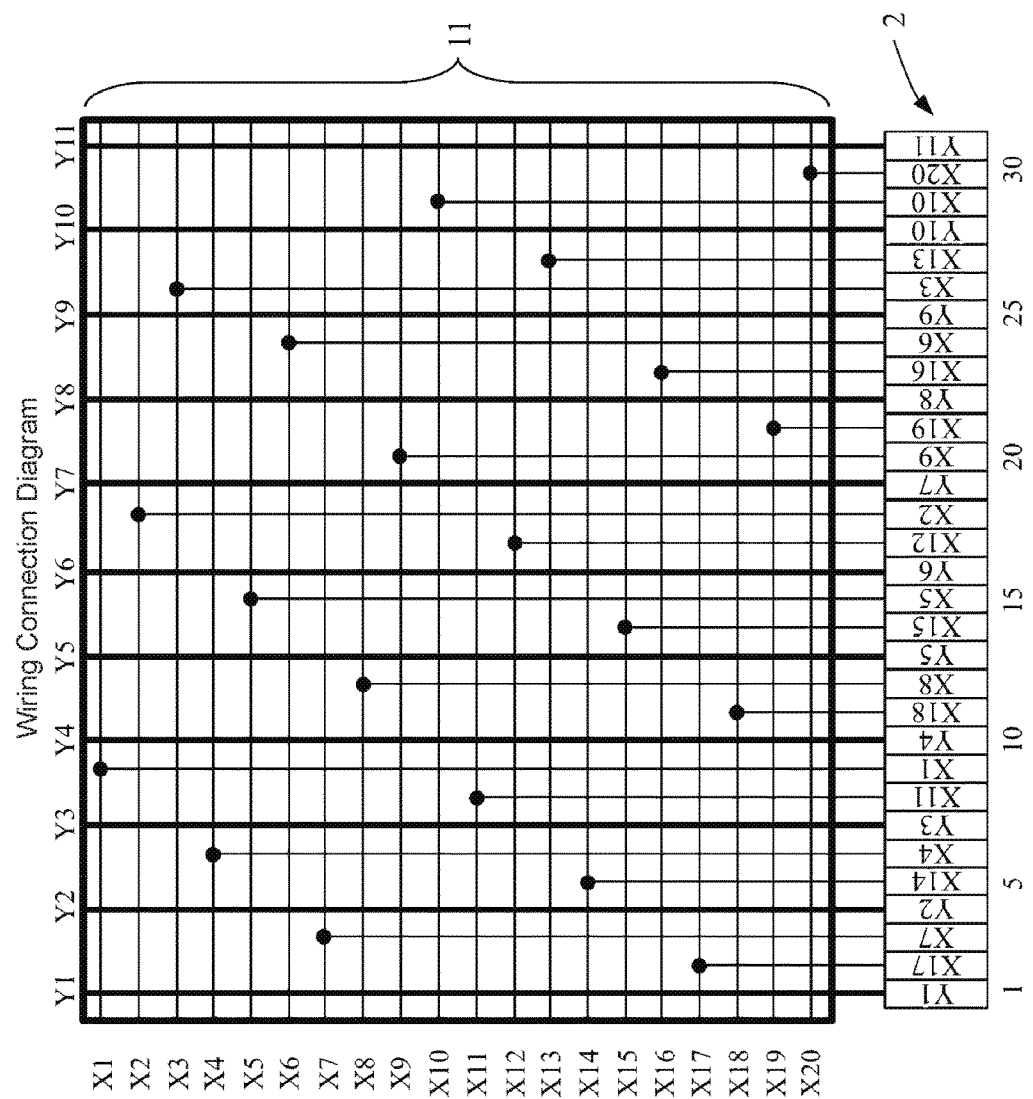
FIG. 6 is a diagram for explaining how respective terminals of a terminal unit 2 are connected to wiring patterns xa1 to xa10, xb1 to xb10, X direction conductive patterns X1 to X20, and Y direction conductive patterns Y1 to Y11.

FIG. 6 is a diagram (a connection wiring diagram) for explaining how the respective terminals of the terminal unit 2 are connected to the wiring patterns xa1 to xa10, xb1 to xb10, the X direction conductive patterns X1 to X20, and the Y direction conductive patterns Y1 to Y11.

As shown in FIG. 6, the number of terminals in the terminal unit 2 in FIG. 6 is "31," and the various terminals have been assigned the terminal numbers 1 to 31. For ease of description, the terminal numbers have been assigned in ascending order moving from left to right in FIG. 6. In other words, the leftmost terminal is the terminal with the terminal number 1, and the rightmost terminal is the terminal with the terminal number 31.

In addition, in FIG. 6, the connection locations of the wiring patterns xa1 to xa10, xb1 to xb10 and the X direction conductive patterns X1 to X20 are indicated by black circles. The terminal of terminal number 2 is shown to be connected to the X direction conductive pattern X17, for example.

In addition, in FIG. 6, the Y direction conductive patterns are indicated by thick lines.

As shown in FIG. 6, the Y direction conductive patterns Y1 to Y11 are connected as described below.

The terminal of terminal number 1 is connected to the Y direction conductive pattern Y1.

The terminal of terminal number 4 is connected to the Y direction conductive pattern Y2.

The terminal of terminal number 7 is connected to the Y direction conductive pattern Y3.

The terminal of terminal number 10 is connected to the Y direction conductive pattern Y4.

The terminal of terminal number 13 is connected to the Y direction conductive pattern Y5.

The terminal of terminal number 16 is connected to the Y direction conductive pattern Y6.

The terminal of terminal number 19 is connected to the Y direction conductive pattern Y7.

The terminal of terminal number 22 is connected to the Y direction conductive pattern Y8.

The terminal of terminal number 25 is connected to the Y direction conductive pattern Y9.

The terminal of terminal number 28 is connected to the Y direction conductive pattern Y10.

The terminal of terminal number 31 is connected to the Y direction conductive pattern Y11.

In addition, as shown in FIG. 6, the X direction conductive patterns X1 to X20 and the wiring patterns xa1 to xa10, xb1 to xb10 are connected as described below.

The terminal of terminal number 2 is connected to the wiring pattern xa1, and the wiring pattern xa1 is connected to the X direction conductive pattern X17.

The terminal of terminal number 3 is connected to the wiring pattern xb1, and the wiring pattern xb1 is connected to the X direction conductive pattern X7.

The terminal of terminal number 5 is connected to the wiring pattern xa2, and the wiring pattern xa2 is connected to the X direction conductive pattern X14.

The terminal of terminal number 6 is connected to the wiring pattern xb2, and the wiring pattern xb2 is connected to the X direction conductive pattern X4.

The terminal of terminal number 8 is connected to the wiring pattern xa3, and the wiring pattern xa3 is connected to the X direction conductive pattern X11.

The terminal of terminal number 9 is connected to the wiring pattern xb3, and the wiring pattern xb3 is connected to the X direction conductive pattern X1.

The terminal of terminal number 11 is connected to the wiring pattern xa4, and the wiring pattern xa4 is connected to the X direction conductive pattern X18.

The terminal of terminal number 12 is connected to the wiring pattern xb4, and the wiring pattern xb4 is connected to the X direction conductive pattern X8.

The terminal of terminal number 14 is connected to the wiring pattern xa5, and the wiring pattern xa5 is connected to the X direction conductive pattern X15.

The terminal of terminal number 15 is connected to the wiring pattern xb5, and the wiring pattern xb5 is connected to the X direction conductive pattern X5.

The terminal of terminal number 17 is connected to the wiring pattern xa6, and the wiring pattern xa6 is connected to the X direction conductive pattern X12.

The terminal of terminal number 18 is connected to the wiring pattern xb6, and the wiring pattern xb6 is connected to the X direction conductive pattern X2.

The terminal of terminal number 20 is connected to the wiring pattern xa7, and the wiring pattern xa7 is connected to the X direction conductive pattern X9.

The terminal of terminal number 21 is connected to the wiring pattern xb7, and the wiring pattern xb7 is connected to the X direction conductive pattern X19.

The terminal of terminal number 23 is connected to the wiring pattern xa8, and the wiring pattern xa8 is connected to the X direction conductive pattern X16.

The terminal of terminal number 24 is connected to the wiring pattern xb8, and the wiring pattern xb8 is connected to the X direction conductive pattern X6.

The terminal of terminal number 26 is connected to the wiring pattern xa9, and the wiring pattern xa9 is connected to the X direction conductive pattern X3.

The terminal of terminal number 27 is connected to the wiring pattern xb9, and the wiring pattern xb9 is connected to the X direction conductive pattern X13.

The terminal of terminal number 29 is connected to the wiring pattern xa10, and the wiring pattern xa10 is connected to the X direction conductive pattern X10.

The terminal of terminal number 30 is connected to the wiring pattern xb10, and the wiring pattern xb10 is connected to the X direction conductive pattern X20.

In this manner, in the touch panel TP, the connecting points of the X direction conductive patterns and the wiring patterns are arranged so as not to be close to each other. In other words, in the touch panel TP, the connecting points of the X direction conductive patterns and the wiring patterns are arranged such that the connecting points of adjacent X direction conductive patterns and the wiring patterns are located such that the distance therebetween is greater than or equal to a prescribed distance. As a result, in the touch panel TP, one X direction conductive pattern and wiring pattern is less likely to be affected by noise generated by another X direction conductive pattern and wiring pattern. As a result, by using the touch panel TP, it is possible to realize a touch panel device that has highly accurate touch detection functionality.

The locations of the connecting points between the X direction conductive patterns and the wiring patterns in the touch panel TP are not limited to the locations shown in FIG. 6. The connecting points of the X direction conductive patterns and the wiring patterns may have an arrangement other than the arrangement shown in FIG. 6 such that the connecting points of the X direction conductive patterns and the wiring patterns are not close to each other.

As described above, in the touch panel TP, the Y direction conductive patterns are arranged so as to be separated from the wiring patterns in the Y direction conductive pattern regions between the electrode units of the X direction conductive patterns. As a result, it is possible to appropriately prevent the occurrence of parasitic capacitance resulting from the Y direction conductive patterns and the wiring patterns. Furthermore, in the touch panel TP, since the connecting points of the X direction conductive patterns and the wiring patterns are arranged so as to be separated from one other, one X direction conductive pattern and wiring pattern is unlikely to be affected by noise generated by another X direction conductive pattern and wiring pattern.

Therefore, by using the touch panel TP, it is possible to realize a touch panel device that has highly accurate touch detection functionality.

In addition, as shown in FIG. 1, the wiring patterns for connecting the X direction conductive patterns are arranged within the display region 11 in the touch panel TP; thus, it is possible to color and narrow the wiring region 12, which must not be too noticeable. In other words, in the touch panel TP, it is possible to decrease the amount of dead space at the periphery of the display region 11 of the touch panel TP.

<Manufacturing Method of the Touch Panel TP>

Next, a method of manufacturing the touch panel TP will be described using FIGS. 5 and 7 to 9.

Specifically, a method of manufacturing the touch panel TP will be described using cross-sectional views of the following, respectively:

(1) a region (the region ARc_X18 in FIG. 4, for example) that, in a wiring pattern region of the touch panel TP, connects adjacent electrode units of an X direction conductive pattern to each other and also connects an X direction conductive pattern and a wiring pattern.

(2) a region (the region AR_X19 in FIG. 4, for example) that connects adjacent electrode units of an X direction conductive pattern to each other in a wiring pattern region of the touch panel TP.

(3) a region (the region ARb_X19 in FIG. 4, for example) that connects adjacent electrode units of an X direction conductive pattern to each other in a Y direction conductive pattern region.

(4) a region in which the terminal unit 2 is disposed.

Figure 7:
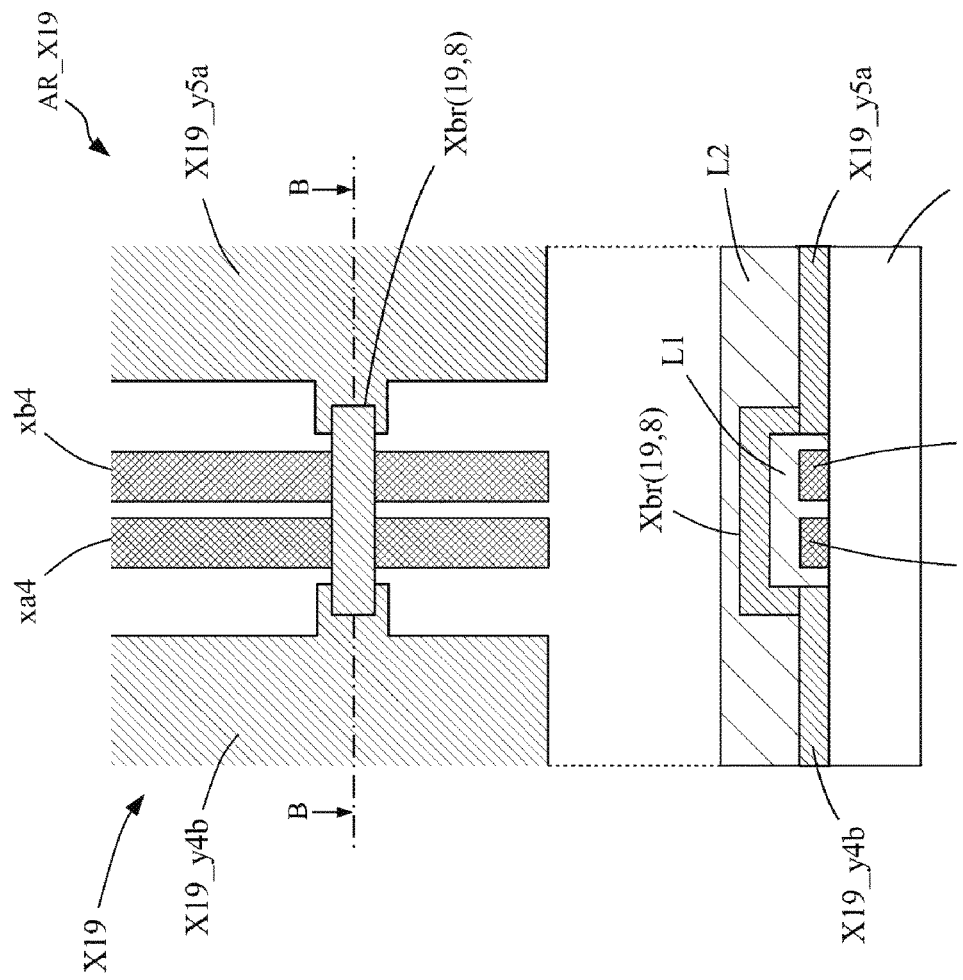
FIG. 7 enlarges and shows a region AR_X19 from FIG. 4.

FIG. 7 enlarges and shows the region AR_X19 from FIG. 4. Specifically, the upper diagram in FIG. 7 is an enlarged view of the region AR_X19, and the lower diagram in FIG. 7 is a B-B cross-sectional view along a line B-B in the upper diagram of FIG. 7.

Figure 8:
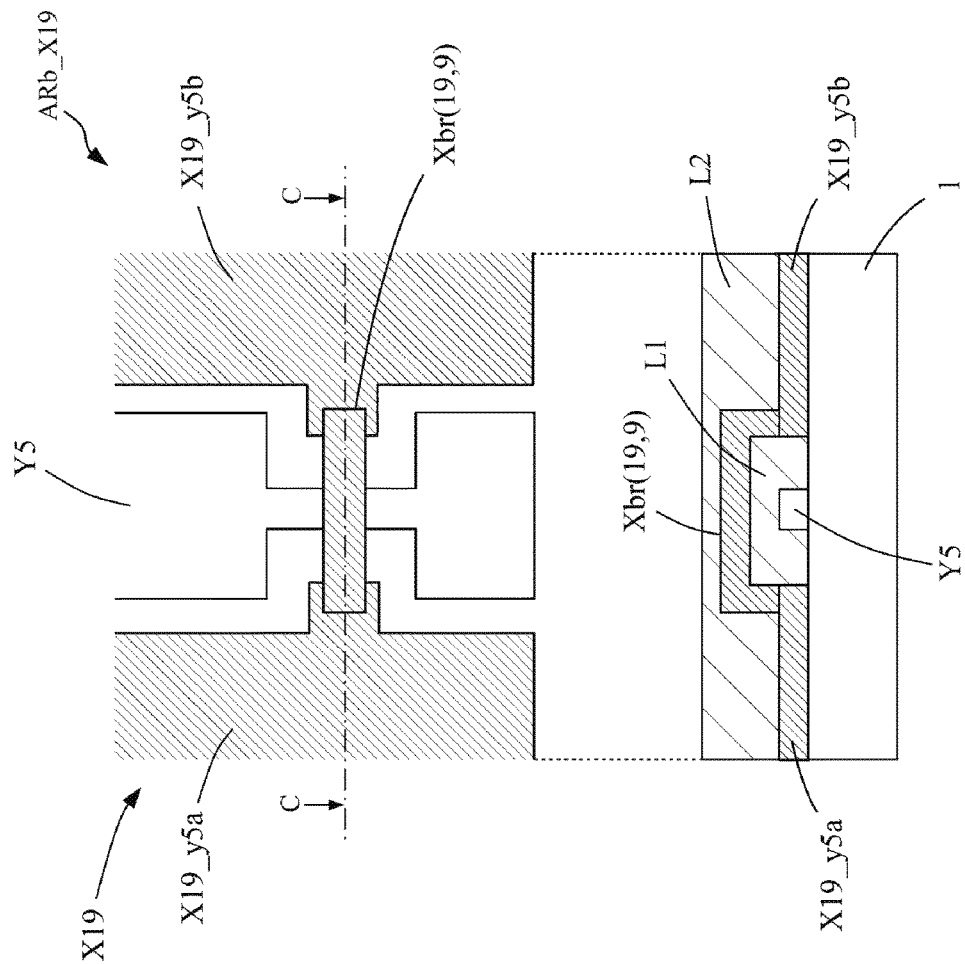
FIG. 8 enlarges and shows a region ARb_X19 from FIG. 4.

FIG. 8 enlarges and shows the region ARb_X19 from FIG. 4. Specifically, the upper diagram in FIG. 8 is an enlarged view of the region ARb_X19, and the lower diagram in FIG. 8 is a C-C cross-sectional view along a line C-C in the upper diagram of FIG. 8.

Figure 9:
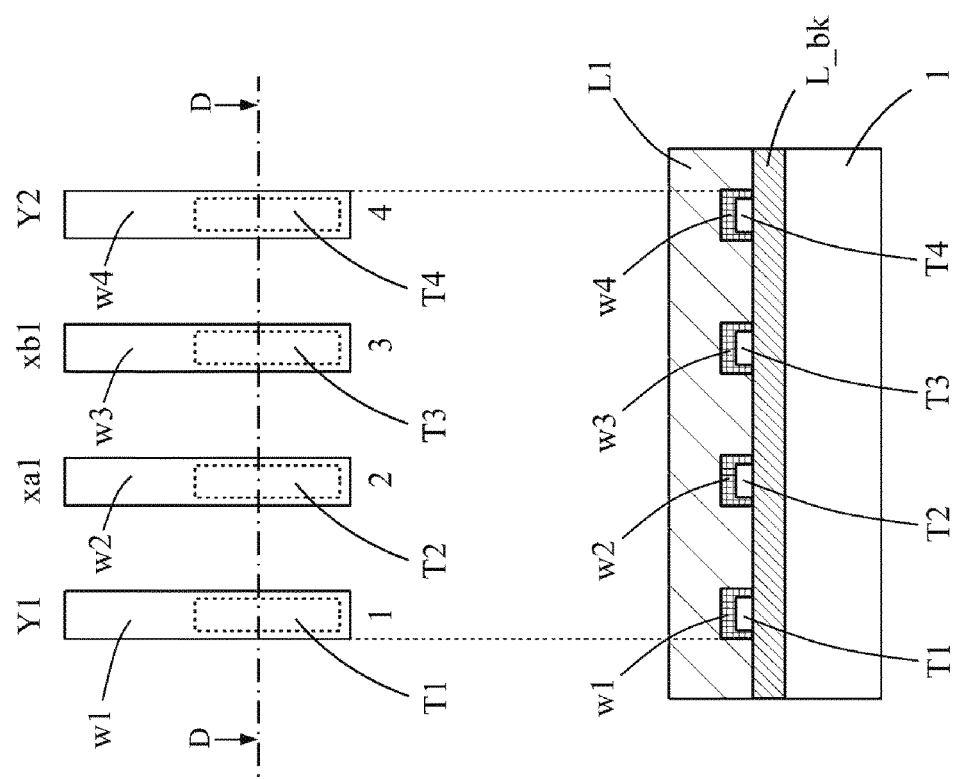
FIG. 9 enlarges and shows a region of FIG. 4 in which the terminal unit 2 is disposed.

FIG. 9 enlarges and shows a region in FIG. 4 in which the terminal unit 2 is disposed. Specifically, the upper diagram in FIG. 9 is an enlarged view of the region in which the terminal unit 2 is disposed, and the lower diagram in FIG. 9 is a D-D cross-sectional view along a line D-D in the upper diagram of FIG. 9.

<1: The Region ARc_X18 (as in FIG. 5)>

First, a method of manufacturing the touch panel TP (a manufacturing method of the region described hereafter) will be described for a region (the region ARc_X18 in FIG. 4, for example) that, in a wiring pattern region of the touch panel TP, connects adjacent electrode units of an X direction conductive pattern to each other and connects the X direction conductive pattern and a wiring pattern.

(1) First, the wiring patterns xa4, xb4 and the electrode units X18_y4b, X18_y5a of an X direction conductive pattern are formed during the step of forming a transparent electrode material (ITO, for example) on the substrate 1. At such time, by ensuring that one of the two wiring patterns xa4, xb4 (xa4 in the case of FIG. 5) and the electrode units of the X direction conductive pattern X18 contact each other, the electrode units of the X direction conductive pattern and the wiring pattern are ensured to be electrically connected.

(2) Next, as shown in FIG. 5, the overcoat layer L1 is formed only on and to the periphery of the wiring patterns xa4, xb4 during the step of photolithography.

(3) Next, as shown in FIG. 5, a transparent electrode material that will function as the connecting section (bridge section) Xbr(18,8) is formed on the overcoat layer L1 and the electrode units X18_y4b, X18_y5a of the X direction conductive pattern.

(4) Lastly, as shown in FIG. 5, an overcoat layer L2 is formed as a protective layer on the connecting section (bridge section) Xbr(18,8) and the electrode units X18_y4b, X18_y5a of the X direction conductive pattern.

<2: The Region AR_X19 (as in FIG. 7)>

Next, a method of manufacturing the touch panel TP (a manufacturing method of the region described hereafter) will be described for a region (the region AR_X19 in FIG. 4, for example) that connects adjacent electrode units of an X direction conductive pattern to each other in a wiring pattern region of the touch panel TP.

(1) First, the wiring patterns xa4, xb4 and the electrode units X19_y4b, X19_y5a of an X direction conductive pattern are formed during the step of forming a transparent electrode material (ITO, for example) on the substrate 1. At such time, as shown in FIG. 7, the wiring patterns xa4, xb4 are arranged so as not to contact any of the other conductive members.

(2) Next, as shown in FIG. 7, the overcoat layer L1 is formed only on and to the periphery of the wiring patterns xa4, xb4 during the step of photolithography.

(3) Next, as shown in FIG. 7, a transparent electrode material that will function as the connecting section (bridge section) Xbr(19,8) is formed on the overcoat layer L1 and the electrode units X19_y4b, X19_y5a of the X direction conductive pattern.

(4) Lastly, as shown in FIG. 7, the overcoat layer L2 is formed as a protective layer on the connecting section (bridge section) Xbr(19,8) and the electrode units X19_y4b, X19_y5a of the X direction conductive pattern.

<The Region ARb_X19 (as in FIG. 8)>

Next, a method of manufacturing the touch panel TP (a manufacturing method of the region described hereafter) will be described for a region (the region ARb_X19 in FIG. 4, for example) that connects adjacent electrode units of an X direction conductive pattern to each other in a Y direction conductive pattern region.

(1) First, the Y direction conductive pattern Y5 and the electrode units X19_y5a, X19_y5b of an X direction conductive pattern are formed during the step of forming a transparent electrode material (ITO, for example) on the substrate 1. At such time, as shown in FIG. 8, the Y direction conductive pattern Y5 is disposed so as not to contact other conductive sections (the electrode units X19_y5a, X19_y5b of the X direction conductive pattern).

(2) Next, as shown in FIG. 8, the overcoat layer L1 is formed only on and to the periphery of the Y direction conductive pattern Y5 during the step of photolithography.

(3) Next, as shown in FIG. 8, a transparent electrode material that will function as the connecting section (bridge section) Xbr(19,9) is formed on the overcoat layer L1 and the electrode units X19_y5a, X19_y5b of the X direction conductive pattern.

(4) Lastly, as shown in FIG. 8, the overcoat layer L2 is formed as a protective layer on the connecting section (bridge section) Xbr(19,9) and the electrode units X19_y5a, X19_y5b of the X direction conductive pattern.

<4: The Terminal Unit 2 Region (as in FIG. 9)>

Next, a method of manufacturing the touch panel TP (a manufacturing method of the region described hereafter) will be described using FIG. 9 for a region (the region in FIG. 4 in which the terminal unit 2 is disposed, for example) that connects adjacent electrode units of an X direction conductive pattern to each other in a Y direction conductive pattern region in which the terminal unit 2 is disposed.

(1) First, a layer (film) L_bk that has been colored black (a colored layer L_bk), for example, is formed on the substrate 1. Metallic film formation is then carried out on the colored layer L_bk, and external connection terminals (terminals T1 to T4 in FIG. 9) are formed.

(2) Next, the step of forming transparent electrodes is performed, and, as shown in FIG. 9, conductive sections that will function as wiring (w1 to w4 in FIG. 9) that connects to either the X direction conductive patterns, the Y direction conductive patterns, or the wiring patterns is formed on the external connection terminals (terminals T1 to T4). As a result, the external connection terminals (terminals T1 to T4) are respectively electrically connected to the corresponding X direction conductive pattern, Y direction conductive pattern, or wiring pattern. In FIG. 9, the terminal T1 is connected to the Y direction conductive pattern Y1 via the wiring w1, for example. The terminal T2 is connected to the wiring pattern xa1 via the wiring w2. The terminal T3 is connected to the wiring pattern xb1 via the wiring w3. The terminal T4 is connected to the Y direction conductive pattern Y2 via the wiring w4.

By carrying out the above-mentioned steps, it is possible to manufacture the touch panel TP.

Since the wiring patterns xa1 to xa10, xb1 to xb10 are formed in the same layer as the X direction conductive patterns X1 to X20 and the Y direction conductive patterns Y1 to Y11 in the above-described manufacturing method of the touch panel TP, it is not necessary to add processing steps for separately forming the wiring patterns xa1 to xa10, xb1 to xb10. Therefore, it is possible to efficiently manufacture the touch panel TP using the above-described method of manufacturing the touch panel TP.

Modification Example 1

Next, Modification Example 1 of Embodiment 1 will be described.

In the present modification example, portions similar to those of Embodiment 1 are assigned the same reference characters and detailed descriptions thereof are omitted.

As shown in FIG. 3, in the touch panel TP of Embodiment 1, locations in the Y axis direction that connect adjacent electrode units of an X direction conductive pattern to each other in wiring pattern regions and locations that connect adjacent electrode units of an X direction conductive pattern to each other in Y direction conductive pattern regions are arranged so as to not match up (to be separated by a distance d1).

Figure 10:
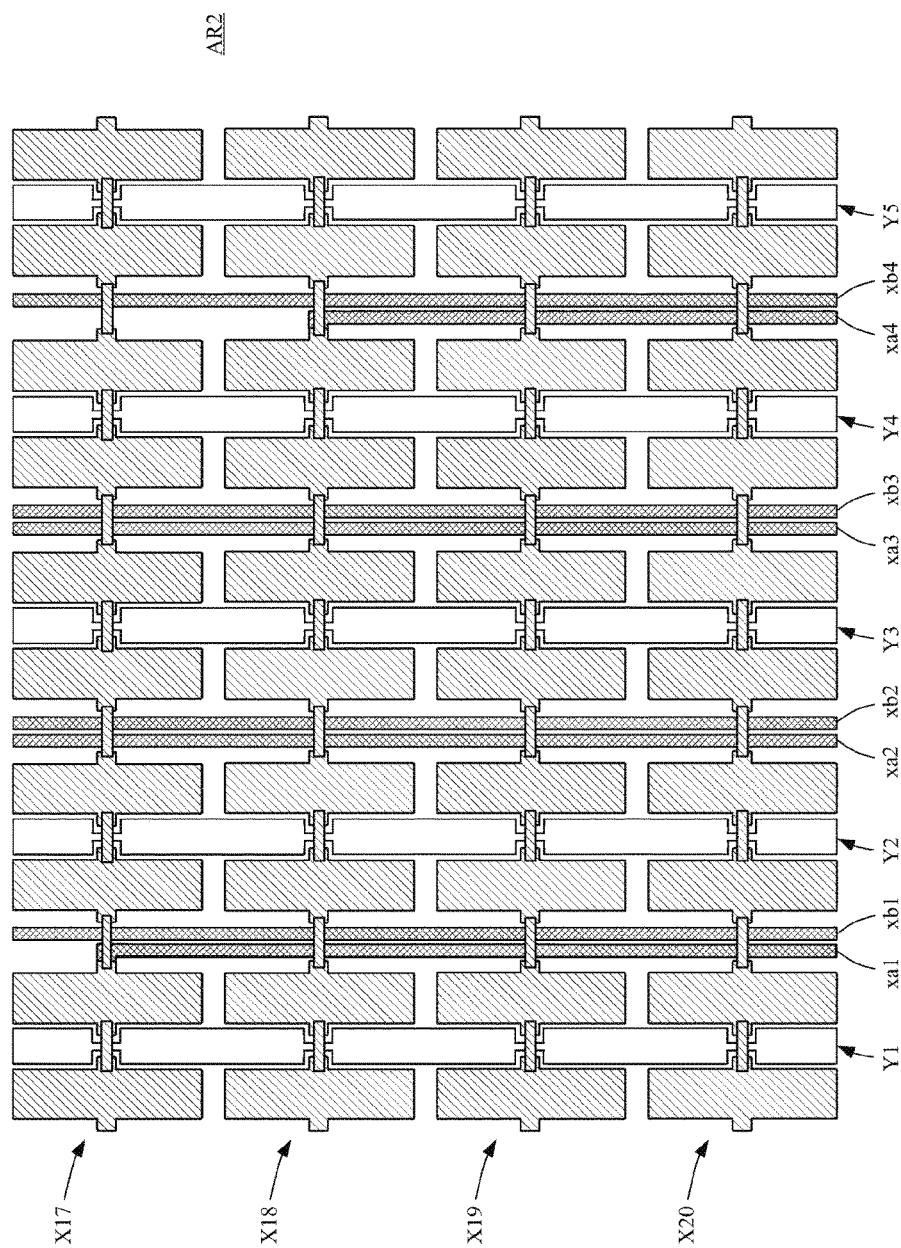
FIG. 10 enlarges and schematically shows a region AR2 of the touch panel TP in Modification Example 1 of Embodiment 1.

As shown in FIG. 10, in the touch panel TP of the present modification example, locations in the Y axis direction that connect adjacent electrode units of an X direction conductive pattern to each other in wiring pattern regions and locations that connect adjacent electrode units of an X direction conductive pattern to each other in Y direction conductive pattern regions are arranged so as to substantially match each other.

This is the only difference between the touch panel TP of the present modification example and the touch panel TP of Embodiment 1.

As shown in FIG. 10, in the touch panel TP of the present modification example, the locations in the Y axis direction that connect adjacent electrode units of the X direction conductive patterns to each other in the wiring pattern regions and locations that connect adjacent electrode units of the X direction conductive patterns to each other in the Y direction conductive pattern regions are arranged so as to substantially match each other. Thus, it is possible to simplify the manufacturing process of the touch panel TP.

Modification Example 2

Next, Modification Example 2 of Embodiment 1 will be described.

In the present modification example, portions similar to those of Embodiment 1 are assigned the same reference characters and detailed descriptions thereof are omitted.

In the touch panel TP of the present modification example, the wiring patterns and the electrode units of the X direction conductive patterns are connected in the wiring pattern regions using through-holes. In addition, the touch panel TP of the present modification example differs from the touch panel TP of Embodiment 1 in that the configuration of the wiring patterns and the X direction conductive patterns in the wiring pattern regions and the configuration of the Y direction conductive patterns and the X direction conductive patterns in the Y direction conductive pattern regions are different.

Other than the differences mentioned above, the touch panel TP of the present modification example is similar to the touch panel TP of Embodiment 1.

Figure 11:
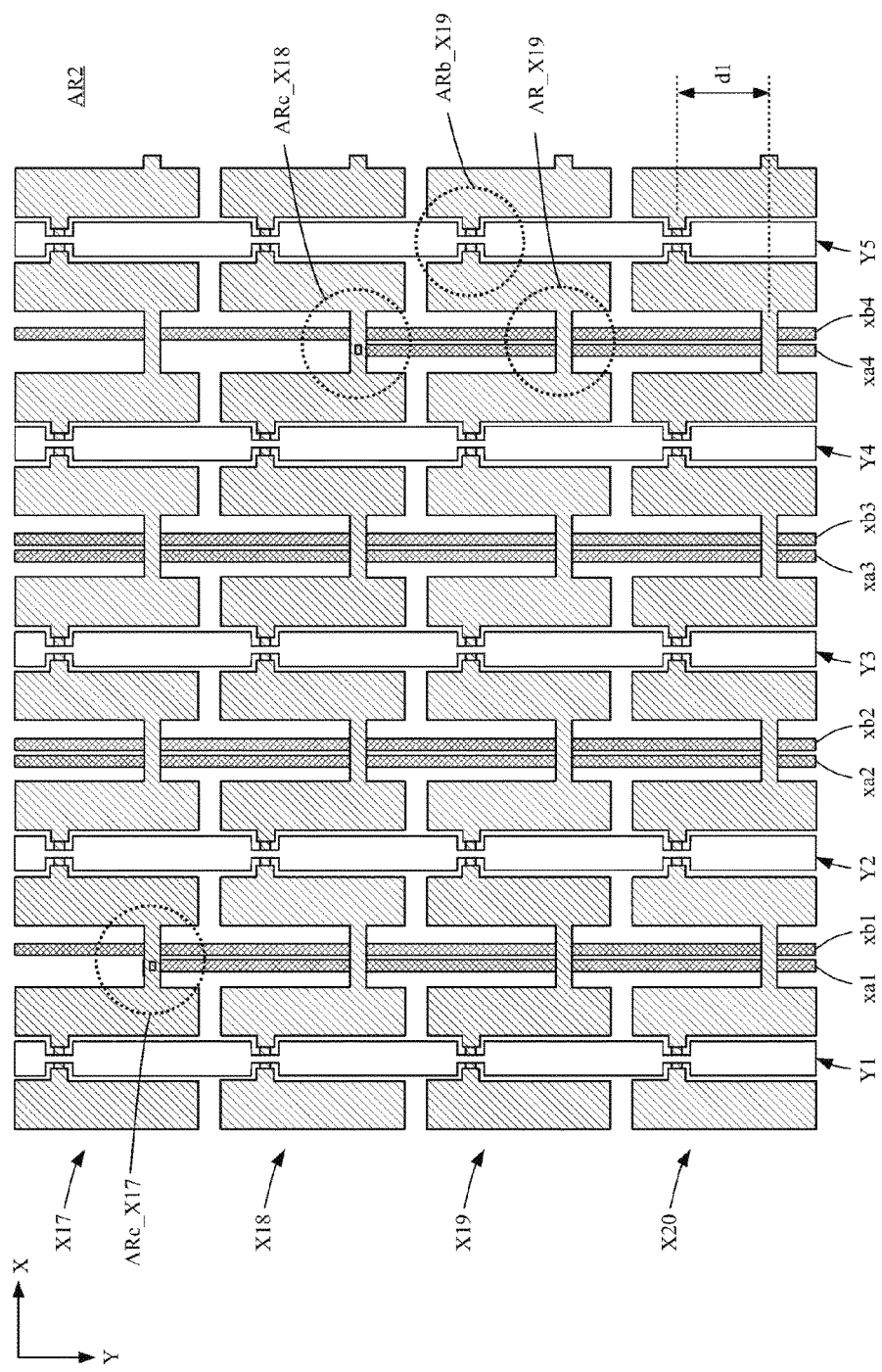
FIG. 11 shows a portion of the plan view of the touch panel TP according to the present modification example of Modification Example 1 of Embodiment 1.

FIG. 11 shows a portion of a plan view of the touch panel TP of the present modification example, and corresponds to FIG. 3, which enlarged and schematically showed the region AR2 that was a portion of the plan view of the touch panel TP of Embodiment 1. As in FIG. 3, for ease of description, the electrode units, connecting sections, and wiring patterns in FIG. 11 are drawn as patterns having a polygonal shape.

Figure 12:
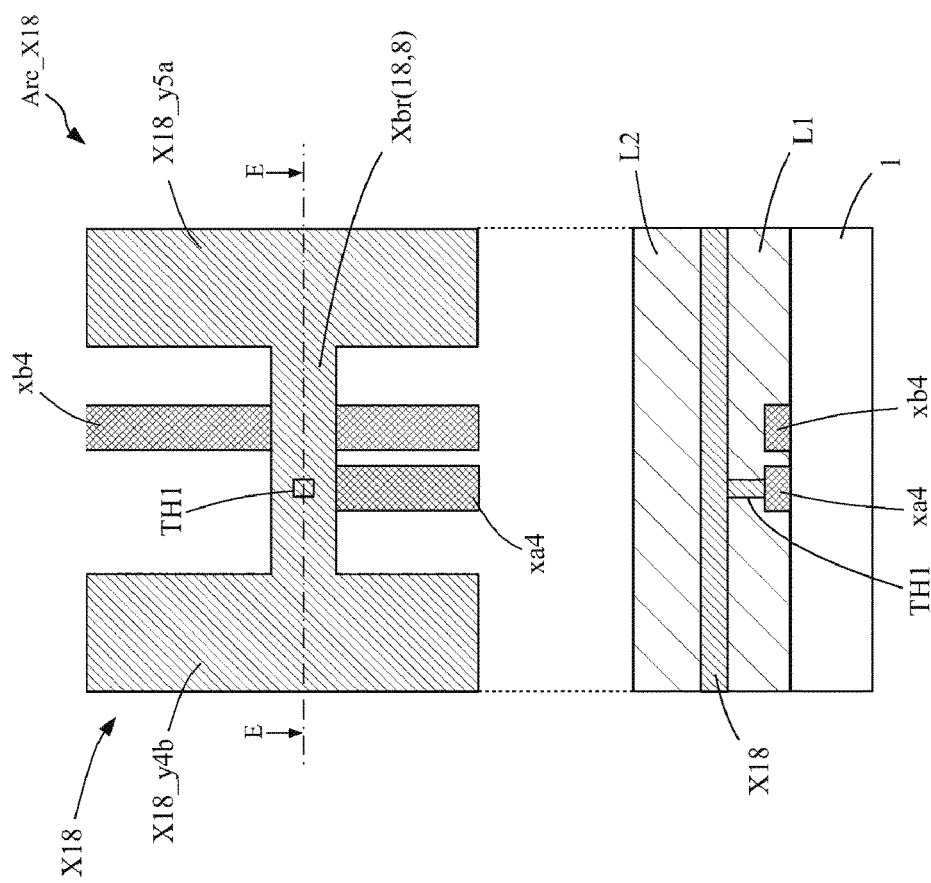
FIG. 12 enlarges and shows the connecting region ARc_X18 shown in FIG. 11.

FIG. 12 enlarges and shows the connecting region ARc_X18 shown in FIG. 11. Specifically, FIG. 12 is an enlarged view (the upper diagram in FIG. 12) of the connecting region ARc_X18 of the X direction conductive pattern X18 and the wiring pattern xa4, and an E-E cross-sectional view (the lower diagram in FIG. 12) along a line E-E in FIG. 12.

As shown in FIG. 12, the X direction conductive pattern X18 is electrically connected to the wiring pattern xa4 in the connecting region ARc_X18 via a conductor housed in a through-hole TH1. The wiring pattern xb4 is disposed in a location that is separated from the X direction conductive pattern X18, the through-hole TH1, and the wiring pattern xa4 via the overcoat layer L1 formed of an insulating substance; thus, the wiring pattern xb4 is insulated from (is not electrically connected to) the X direction conductive pattern X18, the through-hole TH1, and the wiring pattern xa4.

Figure 13:
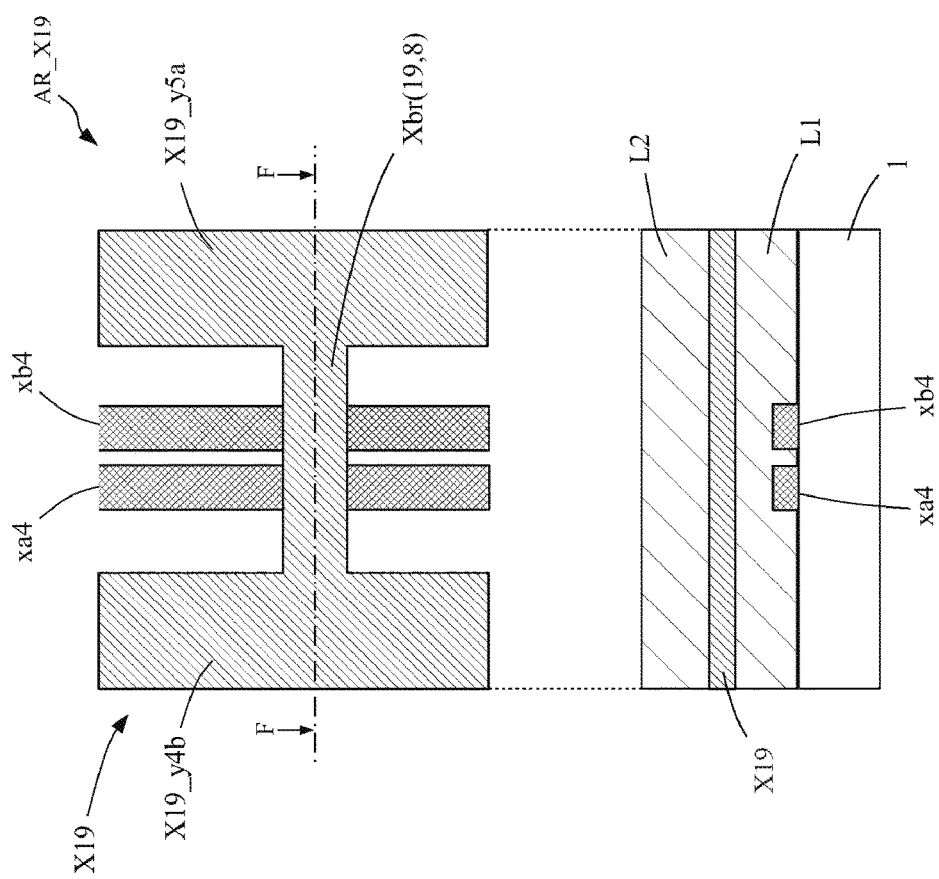
FIG. 13 enlarges and shows the region AR_X19 shown in FIG. 11.

FIG. 13 enlarges and shows the region AR_X19 shown in FIG. 11. Specifically, FIG. 13 is an enlarged view (the upper diagram in FIG. 13) of the region AR_X19 in which the X direction conductive pattern X19 and the wiring patterns xa4, xb4 are disposed, and an F-F cross-sectional view (the lower diagram in FIG. 13) along a line F-F in FIG. 13.

As shown in FIG. 13, the X direction conductive pattern X19 is disposed in a location that is separated from the wiring patterns xa4, xb4 in the region AR_X19 via the overcoat layer L1 formed of an insulating substance. Therefore, the X direction conductive pattern X19 is insulated from (is not electrically connected to) the wiring patterns xa4, xb4.

Figure 14:
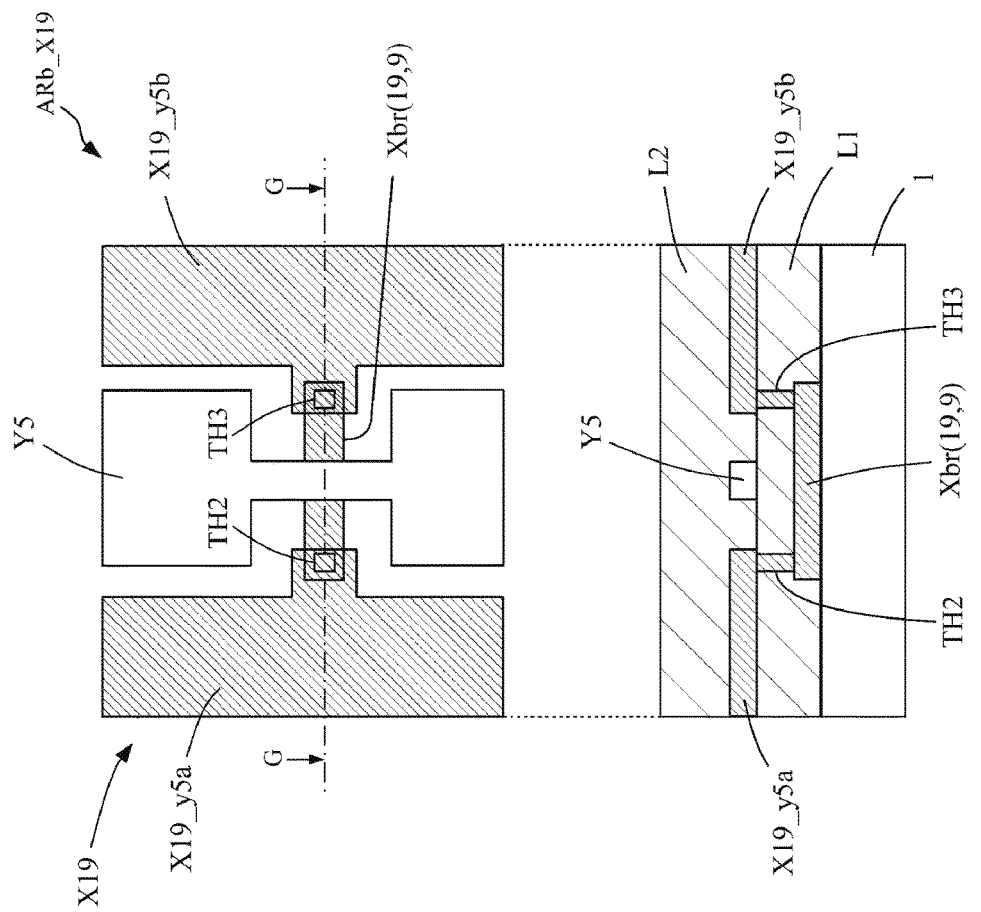
FIG. 14 enlarges and shows the region ARb_X19 shown in FIG. 11.
Figure 15:
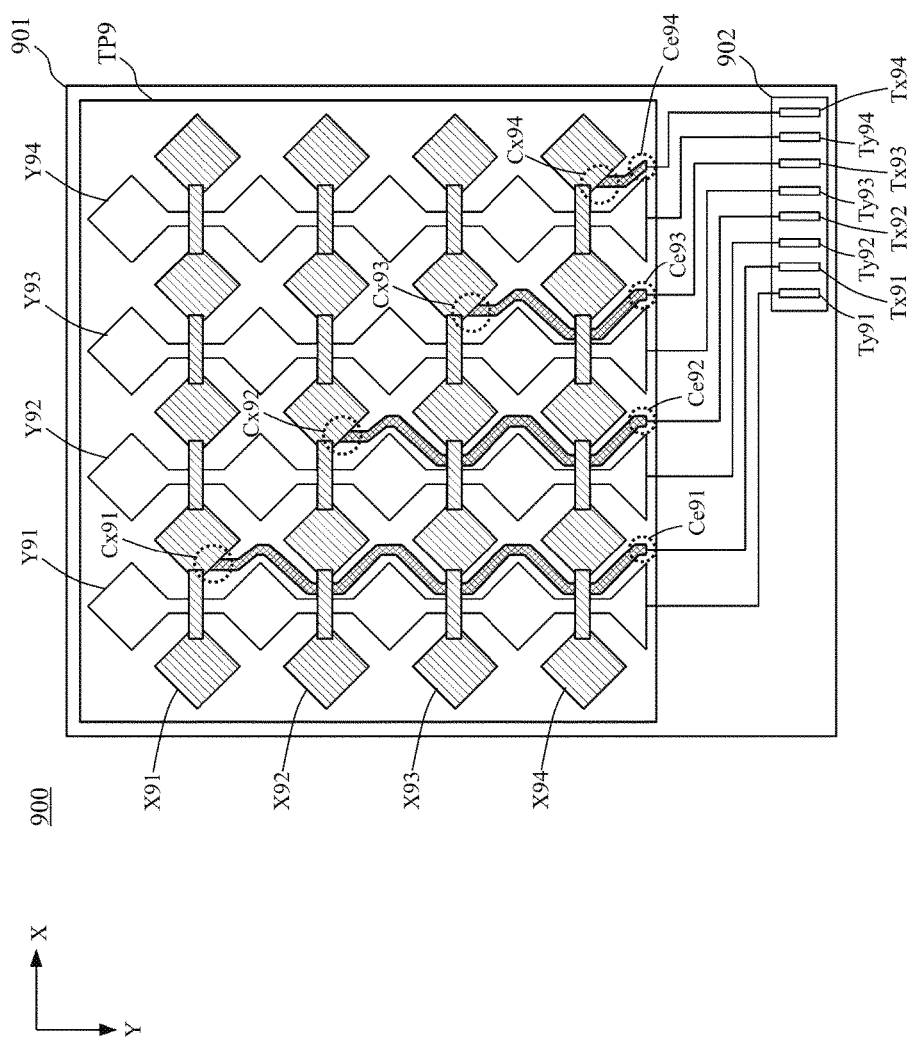
FIG. 15 shows a schematic configuration diagram of a touch panel device 900 realized by using the technology disclosed in Patent Document 1.

FIG. 14 enlarges and shows the region ARb_X19 shown in FIG. 11. Specifically, FIG. 14 is an enlarged view (the upper diagram in FIG. 14) of the region ARb_X19 in which the X direction conductive pattern X19 and the Y direction conductive pattern Y5 are disposed, and a G-G cross-sectional view (the lower diagram in FIG. 14) along a line G-G in FIG. 14.

As shown in FIG. 14, the X direction conductive pattern X19 (the electrode units X19_y5a, X19_y5b) is electrically connected to the connecting section Xbr(19,9) in the region ARb_X19 via a conductor housed in through-holes TH2, TH3. As shown in FIG. 14, the Y direction conductive pattern Y5 is disposed in a location that is separated from the X direction conductive pattern X19, the through-holes TH2, TH3, and the wiring pattern xa4 via the overcoat layer L1 formed of an insulating substance; thus, the wiring pattern xb4 is insulated from (is not electrically connected to) the connecting section Xbr(19,9).

<Manufacturing Method of the Touch Panel TP>

Next, a method of manufacturing the touch panel TP of the present modification example will be described using FIGS. 12 to 14.

Specifically, a method of manufacturing the touch panel TP will be described using cross-sectional views of the following, respectively:

(1) a region (the region ARc_X18 in FIG. 11, for example) that, in a wiring pattern region of the touch panel TP, connects adjacent electrode units of an X direction conductive pattern to each other and also connects the X direction conductive pattern and a wiring pattern.

(2) a region (the region AR_X19 in FIG. 11, for example) that connects adjacent electrode units of an X direction conductive pattern to each other in a wiring pattern region of the touch panel TP.

(3) a region (the region ARb_X19 in FIG. 11, for example) that connects adjacent electrode units of an X direction conductive pattern to each other in a Y direction conductive pattern region.

<1: The Region ARc_X18 (as in FIG. 12)>

First, a method of manufacturing the touch panel TP (a manufacturing method of the region described hereafter) will be described using a region (the region ARc_X18 in FIG. 11, for example) that, in a wiring pattern region of the touch panel TP, connects adjacent electrode units of an X direction conductive pattern to each other and connects the X direction conductive pattern and a wiring pattern.

(1) First, the wiring patterns xa4, xb4, are formed during the step of forming a transparent electrode material (ITO, for example) on the substrate 1.

(2) Next, the overcoat layer L1 made of an insulating substance is formed on and to the periphery of the wiring patterns xa4, xb4. At such time, the through-hole TH1 is provided in the wiring pattern xa4. In other words, a hole is formed via a photolithography step in which a photomask is used at the location of the through-hole TH1.

(3) Next, the through-hole TH1 is filled with a conductor (ITO, for example), and the X direction conductive pattern X18 is then formed on the overcoat layer L1. As a result, the wiring pattern xa4 and the X direction conductive pattern X18 are electrically connected via the through-hole TH1.

(4) Lastly, as shown in FIG. 12, the overcoat layer L2 is formed as a protective layer on the electrode units X18 of the X direction conductive pattern.

<2: The Region AR_X19 (as in FIG. 13)>

Next, a method of manufacturing the touch panel TP (a manufacturing method of the region described hereafter) will be described using a region (the region AR_X19 in FIG. 11, for example) that connects adjacent electrode units of an X direction conductive pattern to each other in a wiring pattern region of the touch panel TP.

(1) First, the wiring patterns xa4, xb4, are formed during the step of forming a transparent electrode material (ITO, for example) on the substrate 1.

(2) Next, the overcoat layer L1 made of an insulating substance is formed on and to the periphery of the wiring patterns xa4, xb4.

(3) Next, the X direction conductive pattern X18 is formed on the overcoat layer L1.

(4) Lastly, as shown in FIG. 13, the overcoat layer L2 is formed as a protective layer on the electrode units X18 of the X direction conductive pattern.

<3: The Region ARb_X19 (as in FIG. 14)>

Next, a method of manufacturing the touch panel TP (a manufacturing method of the region described hereafter) will be described using a region (the region ARb_X19 in FIG. 11, for example) that connects adjacent electrode units of an X direction conductive pattern to each other in a Y direction conductive pattern region.

(1) First, the connecting section Xbr(19,9) is formed during the step of forming a transparent electrode material (ITO, for example) on the substrate 1.

(2) Next, the overcoat layer L1 made of an insulating substance is formed on the connecting section Xbr(19,9) and to the periphery of the connecting section Xbr(19,9). At such time, the through-holes TH2, TH3 are provided on the connecting section Xbr(19,9). In other words, holes are formed via a photolithography step in which a photomask is used at the locations of the through-holes TH2, TH3.

(3) Next, the through-holes TH2, TH3 are filled with a conductor (ITO, for example), and, as shown in FIG. 14, the X direction conductive pattern X19 (the electrode units X19_y5a, X19_y5b) and the Y direction conductive pattern Y5 are then formed on the overcoat layer L1. As a result, the connecting section Xbr(19,9) and the electrode unit X19_y5a of the X direction conductive pattern X19 are electrically connected via the through-hole TH2, and the connecting section Xbr(19,9) and the electrode unit X19_y5b of the X direction conductive pattern X19 are electrically connected via the through-hole TH3.

(4) Lastly, as shown in FIG. 14, the overcoat layer L2 is formed as a protective layer on and to the periphery of the electrode units X19 of the X direction conductive pattern, and on and to the periphery of the Y direction conductive pattern Y5.

The configuration and manufacturing method of the terminal unit 2 region of the touch panel TP of the present modification example are similar to those of Embodiment 1; detailed descriptions thereof will therefore be omitted.

By carrying out the above-mentioned steps, it is possible to manufacture the touch panel TP.

Since the wiring patterns xa1 to xa10, xb1 to xb10 are formed in the same layer as the connecting sections of the X direction conductive patterns X1 to X20 in the above-described manufacturing method of the touch panel TP, it is not necessary to add processing steps for separately forming the wiring patterns xa1 to xa10, xb1 to xb10. Therefore, it is possible to efficiently manufacture the touch panel TP using the above-described method of manufacturing the touch panel TP.

Other Embodiments

In the above-mentioned embodiments (including the modification examples), cases were described in which the number of X direction conductive patterns was "20" and the number of Y direction conductive patterns was "11." The number of X direction conductive patterns and/or the number of Y direction conductive patterns are not limited to the numbers described above and may be different numbers. In addition, the aspect ratio of the display region is not limited to that shown in FIG. 1, for example, and may be a different aspect ratio.

In addition, a case was described in the above-mentioned embodiments (including the modification examples) in which, as shown in FIG. 6, the connecting points of the wiring patterns and X direction conductive patterns on the touch panel TP were set, but the present invention is not limited to this. The connecting points of the X direction conductive patterns and the wiring patterns may have an arrangement other than the arrangement shown in FIG. 6 such that the connecting points of the X direction conductive patterns and the wiring patterns are not close to each other.

Furthermore, the number of wiring patterns disposed in the wiring pattern regions may be determined based on the number of X direction conductive patterns and/or the number of Y direction conductive patterns. In the above-mentioned embodiments (including the modification examples), the number of X direction conductive patterns was "20" and the number of Y direction conductive patterns was "11"; thus, the number of wiring patterns disposed in a wiring pattern region was "2." When the ratio of the number of X direction conductive patterns to the number of Y direction conductive patterns is 1:1, however, it is preferable that the number of wiring patterns disposed in a wiring pattern region be set to "1."

In addition, the shape of the connecting sections (bridge sections) and the shape of the electrode units in the X direction conductive patterns and/or the Y direction conductive patterns shown in the above-mentioned embodiments (including the modification examples) are examples. The present invention is therefore not limited to these shapes, and other shapes may be used.

In addition, the shape and the like of the wiring patterns shown in the above-mentioned embodiments (including the modification examples) are examples. The present invention is therefore not limited to these shapes, and other shapes may be used.

In addition, the arrangement (the arrangement shown in FIG. 6, for example) of the terminals of the terminal unit 2 shown in the above-mentioned embodiments (including the modification examples) is one example, and other arrangements may also be used. Moreover, one or a plurality of GND terminals may be disposed between the terminals for the X direction conductive patterns and the terminals for the Y direction conductive patterns.

In addition, a touch panel device may be realized by using the touch panel TP of the above-described embodiments (including the modification examples). Furthermore, a display device (a liquid crystal display device, for example) that uses the above-mentioned touch panel device may also be realized.

In addition, in the above-mentioned embodiments, only the main components required for the embodiments are described from among the components of the invention in a simplified manner. Accordingly, other appropriate components not described in the above-mentioned embodiments may be included. In addition, in the drawings and the embodiments described above, the dimensions of the various members do not necessarily faithfully represent the actual dimensions, dimensional ratios, and the like. Therefore, it is possible to modify the dimensions, dimensional ratios, and the like without departing from the scope of the present invention.

The specific configurations of the present invention are not limited by the embodiments described above, and various changes and modifications are possible within a scope that does not depart from the gist of the present invention.

<Addendum>

The present invention can also be expressed as follows.

A first invention is a conductive sheet that includes: N (with N being a natural number greater than or equal to two) X direction conductive patterns; M (with M being a natural number greater than or equal to two) Y direction conductive patterns; a terminal unit; and wiring patterns.

The N (with N being a natural number greater than or equal to two) X direction conductive patterns respectively include: a plurality of X direction electrode units disposed in a first direction; and X direction connecting sections that electrically connect adjacent X direction electrode units to each other.

The M (with M being a natural number greater than or equal to two) Y direction conductive patterns respectively include: a plurality of Y direction electrode units disposed in a second direction that intersects the first direction; and Y direction connecting sections that electrically connect adjacent Y direction electrode units to each other.

The terminal unit includes terminals for electrically connecting to the respective X direction conductive patterns and Y direction conductive patterns.

The wiring patterns electrically connect the X direction conductive patterns and the terminals of the terminal unit that correspond to the X direction conductive patterns.

Furthermore, in a plan view, when a region between X direction electrode units and other X direction electrode units that are adjacent to one side of the X direction electrode units in the first direction is a Y direction conductive pattern region and a region between the X direction electrode units and X direction electrode units that are adjacent to the other side of the X direction electrode units in the first direction is a wiring pattern region, a Y direction conductive pattern is disposed in the Y direction conductive pattern region, and a wiring pattern is disposed in the wiring pattern region. The Y direction conductive pattern region and the wiring pattern region are alternately provided in the first direction in regions sandwiched between two adjacent X direction electrode units.

In this conductive sheet, the Y direction conductive patterns are disposed so as to be separated from the wiring patterns in the Y direction conductive pattern regions between X direction electrode units of the X direction conductive patterns. As a result, in this conductive sheet, it is possible to appropriately prevent the occurrence of parasitic capacitance resulting from the Y direction conductive patterns and the wiring patterns. Therefore, in a touch panel device or the like that uses this conductive sheet, it is possible to effectively prevent the generation of noise that overlaps sense signals as a result of the above-mentioned parasitic capacitance. As a result, by using a touch panel device or the like that uses this conductive sheet, it is possible to realize highly accurate touch panel sensitivity.

In addition, in this conductive sheet, wiring patterns that connect the X direction conductive patterns and the terminal unit are provided in the display region, or in other words, the region in which the X direction conductive patterns and the Y direction conductive patterns are disposed; thus, it is not necessary to provide a space for disposing the wiring patterns only. Therefore, in this conductive sheet, it is possible to decrease the amount of dead space at the periphery of the conductive sheet.

"Intersecting" is a concept that includes being perpendicular.

A second invention is the first invention in which, in a plan view, a distance is greater than or equal to a prescribed value, the distance being a distance between: a location in the second direction of a first connecting section that is an X direction connecting section that connects an X direction electrode unit and another X direction electrode unit that is adjacent to the X direction electrode unit on one side in a first direction; and a location in the second direction of a second connecting section that is an X direction connecting section that connects the X direction electrode unit and another X direction electrode unit that is adjacent to the X direction electrode unit on another side in the first direction.

As a result, in this conductive sheet, the X direction connecting sections are arranged in a fixed pattern, and it is possible to suitably prevent the patterns from having an undesirable appearance (such as the occurrence of moiré).

A third invention is the first or second invention in which, in a plan view, a distance is greater than or equal to a prescribed value, the distance being a distance between: a $k^{th}$ connecting point that is a connecting point at which a $k^{th}$ (k being a natural number where k<N) X direction conductive pattern and a wiring pattern that corresponds to the $k^{th}$ X direction conductive pattern are electrically connected, and a k+1 connecting point that is a connecting point at which a k+1 X direction conductive pattern that is adjacent to the $k^{th}$ X direction conductive pattern and a wiring pattern that corresponds to the k+1 X direction conductive pattern are electrically connected.

In this conductive sheet, since the connecting points of the X direction conductive patterns and the wiring patterns are arranged so as to be separated from one other, one X direction conductive pattern and wiring pattern is unlikely to be affected by noise generated by another X direction conductive pattern and wiring pattern.

Therefore, by using this conductive sheet in a touch panel device, for example, it is possible to realize a touch panel device that has highly accurate touch detection functionality.

It is preferable that the "prescribed value" be greater than or equal to a distance that is a times ($1<\alpha<100$) the distance between adjacent electrode units, for example.

A fourth invention is any one of the first to third inventions, which further includes a substrate, and in which the X direction electrode units, the X direction connecting sections, the Y direction electrode units, the Y direction connecting sections, and the wiring patterns are formed in the same layer on the substrate.

Thus, when this conductive sheet is manufactured, it is not necessary to add processing steps for forming the wiring patterns. As a result, it is possible to efficiently manufacture this conductive sheet in a simple and cost-effective manner.

A fifth invention is any one of the first to third inventions, which further includes: a substrate; an insulating layer; and an overcoat layer.

The insulating layer is formed of an insulating substance and has a plurality of through-holes.

The overcoat layer is formed of an insulating substance.

In addition, the X direction connecting section and the wiring patterns are formed in a same first layer on the substrate.

The insulating layer is formed on the first layer.

The X direction electrode units and the Y direction electrode units are formed on the insulating layer, and the X direction electrode units are electrically connected to a wiring pattern or an X direction connecting section via the through-holes in a prescribed location.

As a result, by using through-holes, it is possible to realize a conductive sheet in which the X direction electrode units are connected to a wiring pattern or an X direction connecting section.

A sixth invention is a touch panel device that includes: a conductive sheet that is any one of the first to fifth inventions; and a drive unit.

The drive unit drives the conductive sheet.

As a result, it is possible to realize a touch panel device that uses a conductive sheet that is any one of the first to fifth inventions.

A seventh invention is a display device that includes: a display unit; a control unit; and a touch panel device that is the sixth invention.

The control unit controls the display unit.

As a result, it is possible to realize a display device that uses a touch panel device that is the sixth invention.

INDUSTRIAL APPLICABILITY

The present invention is able to realize a conductive sheet, a touch panel device, and a display device that can decrease the amount of dead space at the periphery of a touch panel and that have highly accurate touch panel sensitivity. Therefore, the present invention is useful in the industrial field of touch panels, and can be implemented in this field.

DESCRIPTION OF REFERENCE CHARACTERS

TP touch panel
1 substrate
11 display region
12 wiring region
2 terminal unit
X1 to X20 X direction conductive pattern
Y1 to Y11 Y direction conductive pattern
xa1 to xa10, xb1 to xb10 wiring pattern
L1 overcoat layer (insulating layer)
L2 overcoat layer

What is claimed is:

1. A conductive sheet, comprising:
an N number of first direction conductive patterns that each include a plurality of first direction electrode units disposed in a first direction and first direction connecting sections that electrically connect the first direction electrode units that are adjacent, where N is a natural number greater than or equal to two, the first direction conductive patterns each extending generally in the first direction and being placed side-by-side with each other in a second direction intersecting the first direction;
an M number of second direction conductive patterns that each include a plurality of second direction electrode units disposed in the second direction and second direction connecting sections that electrically connect the second direction electrode units that are adjacent, where M is a natural number greater than or equal to two, the second direction conductive patterns each extending generally in the second direction;
a terminal unit having terminals arranged side-by-side with each other in the first direction for electrically connecting to the first direction conductive patterns and the second direction conductive patterns, respectively, the terminal unit being disposed at one of ends of the conductive sheet in the second direction; and
a plurality of wiring patterns that electrically connect the first direction conductive patterns and the terminals of the terminal units, respectively, each of the wiring patterns being extending generally in the second direction, every two wiring patterns being disposed side by side with each other in the first direction without any of the first direction electrode units and the second direction electrode units therebetween, thereby forming a bundled pair of the wiring patterns, the wiring patterns that constitute said pair being electrically connected to different ones of the first direction conductive patterns, respectively,
wherein, in a plan view, the plurality of first direction conductive patterns, the plurality of second direction conductive patterns, and the pair of the wiring patterns are arranged to form a matrix such that one of the second direction conductive patterns and the pair of the wiring patterns are disposed alternately and repeatedly side-by-side in the first direction, and that each space between the one of the second direction conductive patterns and the pair of the wiring patterns contains one of the first direction electrode units of each of the first direction conductive patterns so that said each space contains a column, extending in the second direction, of said ones of the first direction electrode units of the respective first direction conductive patterns.

2. The conductive sheet according to claim 1, wherein, in a plan view, in each of the first direction conductive pattern extending in the first direction, locations in the second direction of the respective first connecting sections are staggered and alternate between a position relatively closer to one end of the conductive sheet in the second direction and a position relatively closer to the other end of the conductive sheet.

3. The conductive sheet according to claim 1, wherein, in a plan view, a distance in the first direction between the $k^{th}$ connecting point that is a connecting point electrically connecting the $k^{th}$ (k being a natural number where k<N) first direction conductive pattern to the wiring pattern that corresponds to said $k^{th}$ first direction conductive pattern, and the $k+1^{th}$ connecting point that is a connecting point electrically connecting the $k+1^{th}$ first direction conductive pattern that is adjacent to the $k^{th}$ first direction conductive pattern to the wiring pattern that corresponds to said $k+1^{th}$ first direction conductive pattern, is greater than or equal to a prescribed value such that at least two columns of the second direction conductive patterns are disposed between the $k^{th}$ connecting point and the $k+1^{th}$ connecting point.

4. The conductive sheet according to claim 1, further comprising a substrate,
wherein the first direction electrode units, the first direction connecting sections, the second direction electrode units, the second direction connecting sections, and the wiring patterns are formed in a same layer on the substrate.

5. The conductive sheet according to claim 1, further comprising:
a substrate;
an insulating layer that is formed of an insulating material; and
an overcoat layer formed of an insulating material,
wherein the first direction connecting sections that intersect with the second direction conductive patterns and the wiring patterns are formed in a same first layer on the substrate,
wherein the insulating layer is formed on the first layer,
wherein the first direction electrode units and the second direction electrode units are formed on the insulating layer, and
wherein said first direction connection sections that intersect with the second direction conductive patterns respectively connect adjacent two of the first direction electrode units through through-holes formed in the insulating layer at respective positions, and the first direction conductive patterns are electrically connected to the corresponding wiring patterns, respectively, via through-holes formed in the insulating layer at respective positions.

* * * * *